US011004401B2

(12) United States Patent
Chu et al.

(10) Patent No.: US 11,004,401 B2
(45) Date of Patent: May 11, 2021

(54) ORGANIC LIGHT EMITTING DISPLAY DEVICE

(71) Applicant: Samsung Display Co., Ltd., Yongin-Si (KR)

(72) Inventors: Seongbaik Chu, Busan (KR); Eungtaek Kim, Hwaseong-si (KR); Seongmin Wang, Seongnam-si (KR); Young-in Hwang, Suwon-si (KR)

(73) Assignee: Samsung Display Co., Ltd.

(*) Notice: Subject to any disclaimer, the term of this patent is extended or adjusted under 35 U.S.C. 154(b) by 0 days.

(21) Appl. No.: 16/434,237

(22) Filed: Jun. 7, 2019

(65) Prior Publication Data

US 2020/0074936 A1 Mar. 5, 2020

(30) Foreign Application Priority Data

Aug. 28, 2018 (KR) ........................ 10-2018-0101369

(51) Int. Cl.

| | |
|---|---|
| ***G06F 1/00*** | (2006.01) |
| ***G09G 3/3291*** | (2016.01) |
| ***G09G 3/3266*** | (2016.01) |
| ***G09G 3/3233*** | (2016.01) |

(52) U.S. Cl.

CPC ......... *G09G 3/3291* (2013.01); *G09G 3/3233* (2013.01); *G09G 3/3266* (2013.01); *G09G 2300/0426* (2013.01); *G09G 2300/0439* (2013.01); *G09G 2300/0809* (2013.01); *G09G 2310/08* (2013.01)

(58) Field of Classification Search

None

See application file for complete search history.

(56) References Cited

U.S. PATENT DOCUMENTS

| | | | | |
|---|---|---|---|---|
| 7,759,863 | B2 | 7/2010 | Kim et al. | |
| 9,412,303 | B2 * | 8/2016 | Kim ........................ | G09G 3/325 |
| 10,050,097 | B2 | 8/2018 | Oh et al. | |
| 2017/0141340 | A1 * | 5/2017 | Tanaka ................ | H01L 51/5016 |
| 2018/0061858 | A1 * | 3/2018 | Lee ................... | G02F 1/133345 |
| 2020/0258918 | A1 * | 8/2020 | Rui ..................... | H01L 27/1225 |

FOREIGN PATENT DOCUMENTS

| | | | |
|---|---|---|---|
| KR | 10-1242030 | B1 | 3/2013 |
| KR | 10-2015-0146117 | A | 12/2015 |
| KR | 10-2017-0049705 | A | 5/2017 |

* cited by examiner

*Primary Examiner* — Michael A Faragalla

(74) *Attorney, Agent, or Firm* — Innovation Counsel LLP

(57) ABSTRACT

An organic light emitting display device includes a substrate, a light emitting diode, a first transistor controlling a driving current of the light emitting diode, a second transistor including a second drain electrode connected to a first source electrode of the first transistor, a second gate electrode, a second channel overlapped with the second gate electrode when viewed in a plan view, a second source electrode facing the second drain electrode with the second channel interposed therebetween, and a lower gate electrode, and a plurality of driving voltage lines transmitting a first driving voltage. The lower gate electrode of the second transistor is overlapped with the second channel when viewed in a plan view, and the lower gate electrode is electrically connected to a corresponding driving voltage line among the driving voltage lines.

20 Claims, 14 Drawing Sheets

ORGANIC LIGHT EMITTING DISPLAY DEVICE

CROSS-REFERENCE TO RELATED APPLICATION

This U.S. non-provisional patent application claims priority under 35 U.S.C. § 119 of Korean Patent Application No. 10-2018-0101369, filed on Aug. 28, 2018, the contents of which are hereby incorporated by reference in its entirety.

BACKGROUND

1. Field of Disclosure

The present disclosure relates to a display device. More particularly, the present disclosure relates to an organic light emitting display device including the pixel.

2. Description of the Related Art

An organic light emitting display device includes pixels. Each of the pixels includes an organic light emitting diode and a circuit part controlling the organic light emitting diode. The circuit part includes at least a switching transistor, a driving transistor, and a storage capacitor.

The organic light emitting diode includes an anode, a cathode, and an organic light emitting layer disposed between the anode and the cathode. The organic light emitting diode emits a light when a voltage equal to or greater than a threshold voltage of the organic light emitting layer is applied to between the anode and the cathode.

SUMMARY

The present disclosure provides an organic light emitting display device including the pixel.

Embodiments of the inventive concept provide an organic light emitting display device including a substrate, a light emitting diode disposed on the substrate and including an anode and a cathode, a first transistor including a first source electrode, a first gate electrode, a first channel overlapped with the first gate electrode when viewed in a plan view, and a first drain electrode facing the first source electrode with the first channel interposed therebetween and controlling a driving current of the light emitting diode, a second transistor including a second drain electrode connected to the first source electrode of the first transistor, a second gate electrode, a second channel overlapped with the second gate electrode when viewed in a plan view, a second source electrode facing the second drain electrode with the second channel interposed therebetween and a lower gate electrode, and a plurality of driving voltage lines transmitting a first driving voltage. The lower gate electrode of the second transistor is overlapped with the second channel when viewed in a plan view, and the lower gate electrode is electrically connected to a corresponding driving voltage line among the driving voltage lines.

The organic light emitting display device further includes a plurality of scan lines extending in a first direction and arranged spaced apart from each other in a second direction crossing the first direction, and the second gate electrode of the second transistor is connected to a corresponding scan line among the scan lines.

The driving voltage lines respectively correspond to the scan lines and each of the driving voltage lines is overlapped with a corresponding scan line among the scan lines.

The driving voltage lines are electrically connected to each other.

A width in the second direction of each of the driving voltage lines is wider than a width in the second direction of the corresponding scan line among the scan lines.

The organic light emitting display device further includes a voltage line extending in the second direction in the non-display area, the substrate includes a display area in which the light emitting diode is disposed and a non-display area disposed adjacent to the display area, and the driving voltage lines extend from the voltage line in the first direction.

The lower gate electrode is disposed between the substrate and a second active pattern that includes the second source electrode, the second channel, and the second drain electrode of the second transistor.

The driving voltage lines is not overlapped with a first active pattern that includes the first source electrode, the first channel, and the first drain electrode of the first transistor when viewed in a plan view.

The organic light emitting display device further includes a plurality of data lines extending in a second direction and arranged spaced apart from each other in a first direction different from the second direction, and the second source electrode of the second transistor is connected to a corresponding data line among the data lines.

The driving voltage lines respectively correspond to the data lines and each of the driving voltage lines is overlapped with the corresponding data line among the data lines.

The driving voltage lines are connected to each other.

Each of the driving voltage lines has a width wider than a width in the first direction of the corresponding data line among the data lines.

A doping concentration of the first channel of the first transistor is different from a doping concentration of the second channel of the second transistor.

The organic light emitting display device further includes a sixth transistor that comprises a sixth source electrode connected to the first drain electrode of the first transistor, a sixth drain electrode connected to the anode of the light emitting diode, and a sixth channel disposed between the sixth source electrode and the sixth drain electrode.

Embodiments of the inventive concept provide an organic light emitting display device including a substrate, a plurality of pixels disposed on the substrate, a plurality of scan lines extending in a first direction and respectively connected to the pixels, a plurality of data lines extending in a second direction crossing the first direction and respectively connected to the pixels, and a plurality of driving voltage lines transmitting a first driving voltage to the pixels. Each of the pixels includes a light emitting diode that includes an anode and a cathode, a first transistor including a first source electrode, a first gate electrode, a first channel overlapped with the first gate electrode when viewed in a plan view, and a first drain electrode facing the first source electrode with the first channel interposed therebetween and controlling a driving current of the light emitting diode, and a second transistor including a second drain electrode connected to the first source electrode of the first transistor, a second gate electrode connected to a corresponding scan line among the scan lines, a second channel overlapped with the second gate electrode when viewed in a plan view, a second source electrode facing the second drain electrode with the second channel interposed therebetween and connected to a corresponding data line among the data lines and a lower gate electrode. The lower gate electrode is electrically connected to a corresponding driving voltage line among the driving voltage lines.

The lower gate electrode of the second transistor is overlapped with the second channel when viewed in a plan view.

The driving voltage lines extend in the first direction and each of the driving voltage lines is overlapped with a corresponding scan line among the scan lines.

The organic light emitting display device further includes a voltage line extending in the second direction in the non-display area, the substrate includes a display area in which the light emitting diode is disposed and a non-display area disposed adjacent to the display area, and the driving voltage lines extend from the voltage line in the first direction.

The driving voltage lines extend in the second direction, and each of the driving voltage line is overlapped with the corresponding data line among the data lines when viewed in a plan view.

The driving voltage lines are not overlapped with a first active pattern that includes the first source electrode, the first channel and the first drain electrode of the first transistor when viewed in a plan view.

According to the above, the switching transistor of the organic light emitting display device may have a double-gate structure, and a high voltage may be applied to the lower gate electrode. Accordingly, the threshold voltage of the switching transistor may be prevented from being positive shifted on a high-temperature operation environment, and thus a display quality may be improved. In addition, since the doping concentration of the active area of the switching transistor is controlled, a variation in range of the threshold voltage of the switching transistor may be controlled. Therefore, the threshold voltage of the switching transistor may be finely controlled within a desired range by controlling the voltage applied to the lower gate electrode of the switching transistor and the doping concentration of the active area of the switching transistor.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
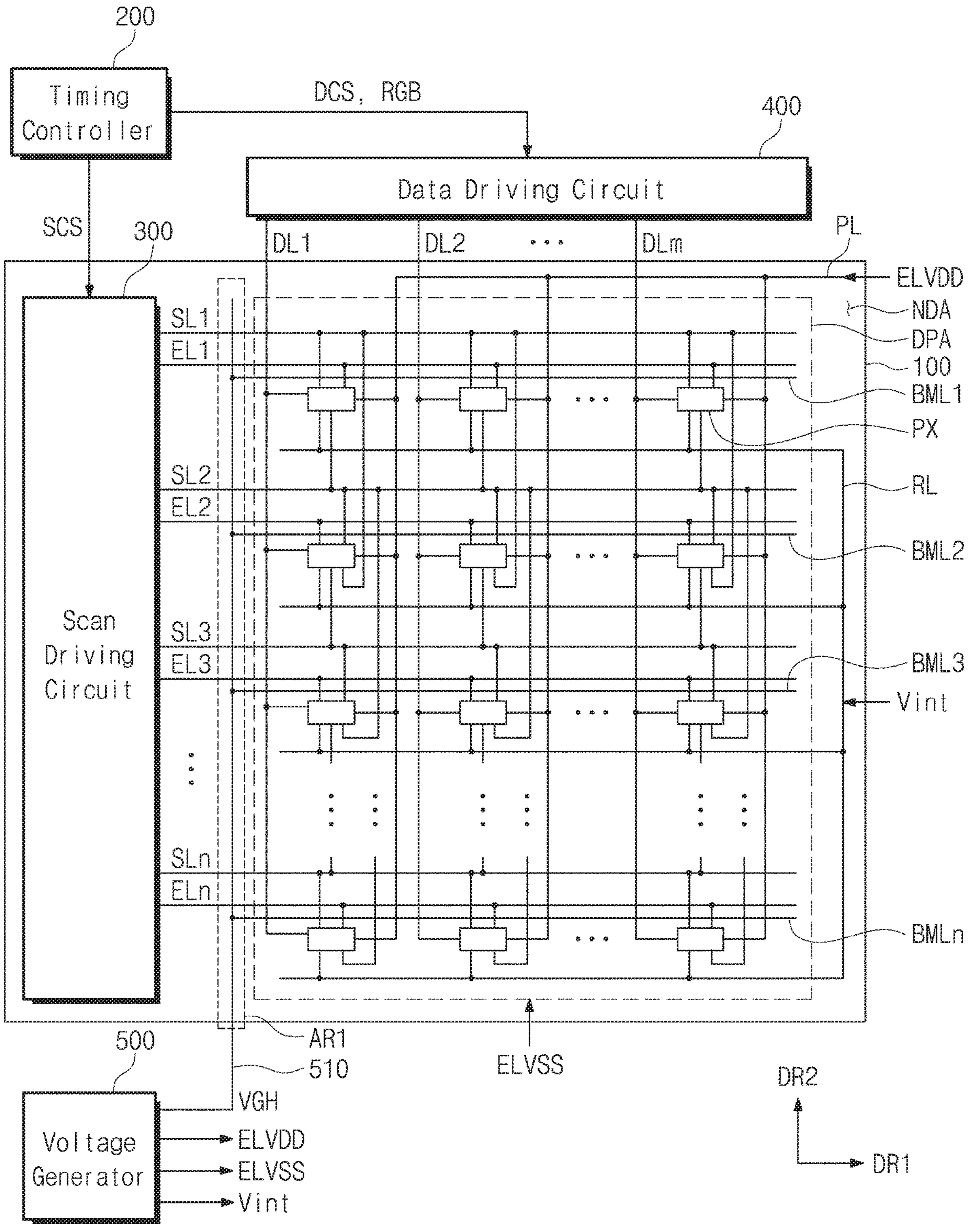
FIG. 1 is a block diagram showing an organic light emitting display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness of layers, films, and regions are exaggerated for clarity.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present inventive concept will be explained in detail with reference to the accompanying drawings.

FIG. 1 is a block diagram showing an organic light emitting display device according to an exemplary embodiment of the present disclosure.

Referring to FIG. 1, the organic light emitting display device includes a display substrate 100, a timing controller 200, a scan driving circuit 300, a data driving circuit 400, and a voltage generator 500.

The timing controller 200 receives input image signals (not shown) and converts a data format of the input image signals to a data format appropriate to an interface with the data driving circuit 400 to generate image data RGB. The timing controller 200 outputs a scan control signal SCS, the image data RGB, and a data control signal DCS.

The scan driving circuit 300 receives the scan control signal SCS from the timing controller 200. The scan control signal SCS includes a vertical start signal that starts an operation of the scan driving circuit 300 and a clock signal that determines an output timing of signals. The scan driving circuit 300 generates a plurality of scan signals and sequentially outputs the scan signals to a plurality of scan lines SL1 to SLn described later. In addition, the scan driving circuit 300 generates a plurality of light emitting control signals in response to the scan control signal SCS and outputs the light emitting control signals to a plurality of light emitting lines EL1 to ELn described later.

FIG. 1 shows the scan signals and the light emitting control signals, which are output from one scan driving circuit 300, however the present disclosure should not be limited thereto or thereby. According to another embodiment, a plurality of scan driving circuits may output the scan signals after dividing the scan signals and may output the light emitting control signals after dividing the light emitting control signals. In addition, according to another embodiment, a driving circuit that generates and outputs the scan signals may be distinct from a driving circuit that generates and outputs the light emitting control signals.

The data driving circuit 400 receives the data control signal DCS and the image data RGB from the timing controller 200. The data driving circuit 400 converts the image data RGB to data signals and outputs the data signals to a plurality of data lines DL1 to DLm described later. The data signals are analog voltages corresponding to grayscale values of the image data RGB.

The voltage generator 500 generates voltages required for the operation of the organic light emitting display device. In the present exemplary embodiment, the voltage generator 500 generates a first driving voltage ELVDD, a second driving voltage ELVSS, an initialization voltage Vint, and a third driving voltage VGH. The third driving voltage VGH is applied to a voltage line 510 arranged in a non-display area NDA of the display substrate 100. The third driving voltage VGH may have a voltage level corresponding to a high voltage of the scan signals generated by the scan driving circuit 300. According to another embodiment, the third driving voltage VGH may be applied to the scan driving circuit 300.

The display substrate 100 includes the scan lines SL1 to SLn, the light emitting lines EL1 to ELn, the data lines DL1 to DLm, third driving voltage lines BML1 to BMLn, and pixels PX. The scan lines SL1 to SLn extend in a first direction DR1 and are arranged in a second direction DR2 to be spaced apart from each other.

Each of the light emitting lines EL1 to ELn may be arranged parallel to a corresponding scan line among the scan lines SL1 to SLn. In addition, each of the third driving voltage lines BML1 to BMLn may be arranged parallel to a corresponding scan line among the scan lines SL1 to SLn. In the present exemplary embodiment, the number of the third driving voltage lines BML1 to BMLn is equal to the number of the pixels arranged in the second direction DR2, i.e., the number of the scan lines SL1 to SLn. The data lines DL1 to DLm are insulated from the scan lines SL1 to SLn while crossing the scan lines SL1 to SLn.

Each of the pixels PX is connected to a corresponding scan line among the scan lines SL1 to SLn, a corresponding light emitting line among the light emitting lines EL1 to ELn, and a corresponding data line among the data lines DL1 to DLm. In addition, each of the pixels PX is connected to a corresponding third driving voltage line among the third driving voltage lines BML1 to BMLn Each of the pixels PX receives a first driving voltage ELVDD, a second driving voltage ELVSS having a level lower than that of the first driving voltage ELVDD, and a third driving voltage VGH. Each of the pixels PX is connected to a first driving voltage line PL to which the first driving voltage ELVDD is applied. Each of the pixels PX is connected to an initialization line RL receiving the initialization voltage Vint.

Each of the pixels PX may be electrically connected to three scan lines. As shown in FIG. 1, pixels arranged in a second pixel row may be connected to first, second, and third scan lines SL1, SL2, and SL3.

Although not shown in figures, the display substrate 100 may further include a plurality of dummy scan lines. The display substrate 100 may further include a dummy scan line connected to pixels PX arranged in a first pixel row and a dummy scan line connected to pixels PX arranged in an n-th pixel row. In addition, pixels (hereinafter, referred to as "pixels of a pixel column") connected to one data line among the data lines DL1 to DLm may be connected to each other. Further, two adjacent pixels among the pixels of the pixel column may be electrically connected to each other.

Each of the pixels PX includes an organic light emitting diode (not shown) and a pixel circuit part (not shown) controlling the light emission of the light emitting diode. The pixel circuit part includes a plurality of transistors and a capacitor. At least one of the scan driving circuit 300 and the data driving circuit 400 may include transistors formed through the same process as the pixel circuit part.

The scan lines SL1 to SLn, the light emitting lines EL1 to ELn, the third driving voltage lines BML1 to BMLn, the data lines DL1 to DLm, the first driving voltage line PL, the initialization line RL, the pixels PX, the scan driving circuit 300, and the data driving circuit 400 may be formed on the base substrate (not shown) through a plurality of photolithography processes. Insulating layers may be formed on the base substrate (not shown) through a plurality of depositing processes and a plurality of coating processes. Each of the insulating layers may be a thin film layer that covers the entire of the display substrate 100 or may include at least one insulating pattern overlapped with only a specific component of the display substrate 100. The insulating layers include an organic layer and/or an inorganic layer. In addition, an encapsulation layer (not shown) may be further formed on the base substrate.

The display substrate 100 receives the first driving voltage ELVDD and the second driving voltage ELVSS. The first driving voltage ELVDD may be applied to the pixels PX through the first driving voltage line PL. The second driving voltage ELVSS may be applied to the pixels PX through electrodes (not shown) formed on the display substrate 100 or a power source line (not shown).

The display substrate 100 receives the initialization voltage Vint. The initialization voltage Vint may be applied to the pixels PX through the initialization voltage line RL.

The display substrate 100 receives the third driving voltage VGH. The third driving voltage VGH may be applied to the pixels PX through the third driving voltage lines BML1 to BMLn formed on the display panel.

The display substrate 100 includes a display area DPA and a non-display area NDA. The pixels PX are arranged in the display area DPA. In the present exemplary embodiment, the scan driving circuit 300 is disposed in the non-display area NDA disposed at one side of the display area DPA. The third driving voltage VGH provided from the voltage generator 500 is applied to the pixels PX through the voltage line 510 arranged in the non-display area NDA and the third driving voltage lines BML1 to BMLn arranged in the display area DPA.

Figure 2:
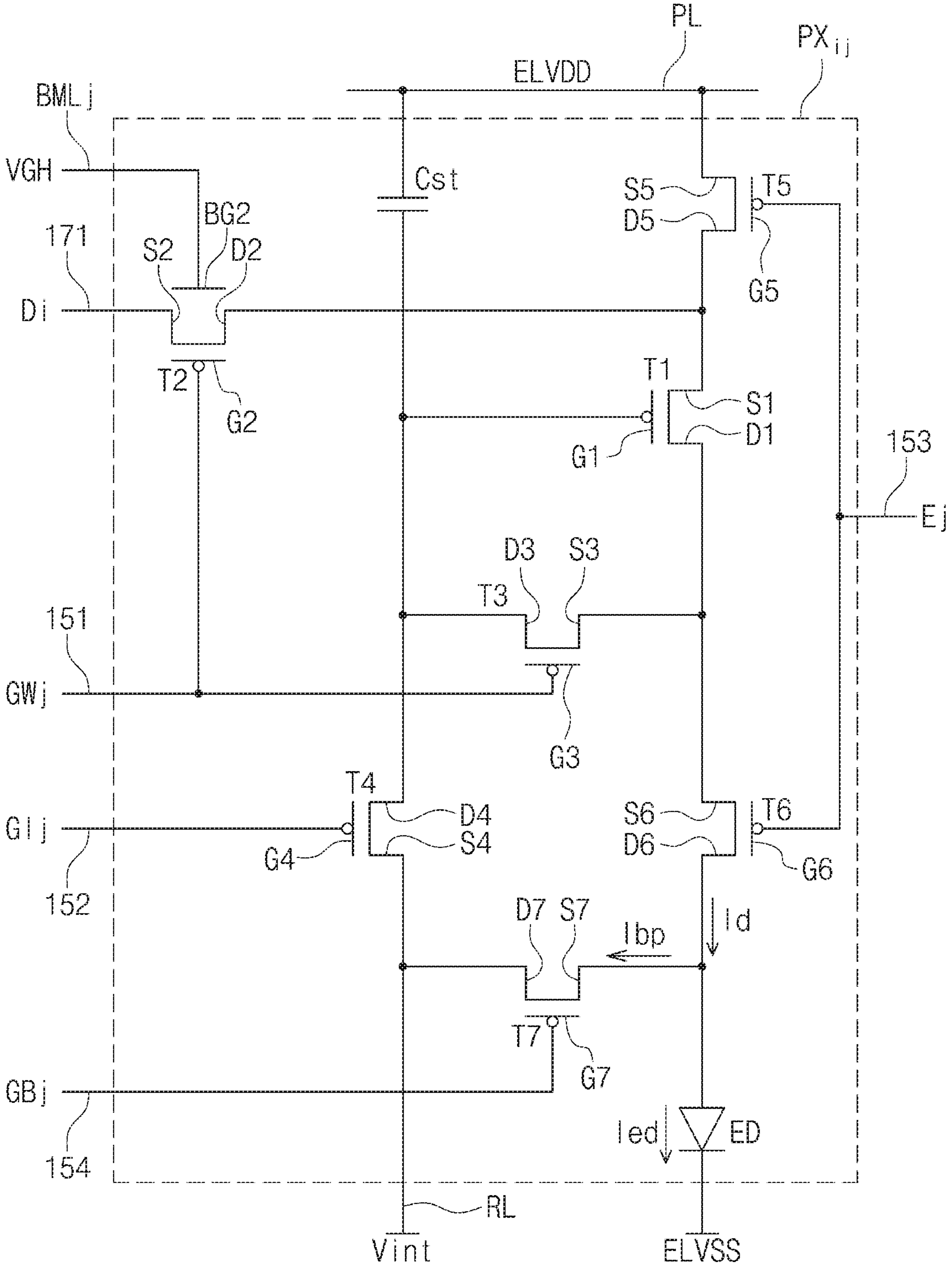
FIG. 2 is an equivalent circuit diagram showing a pixel of an organic light emitting display device according to an exemplary embodiment of the present disclosure.
Figure 3:
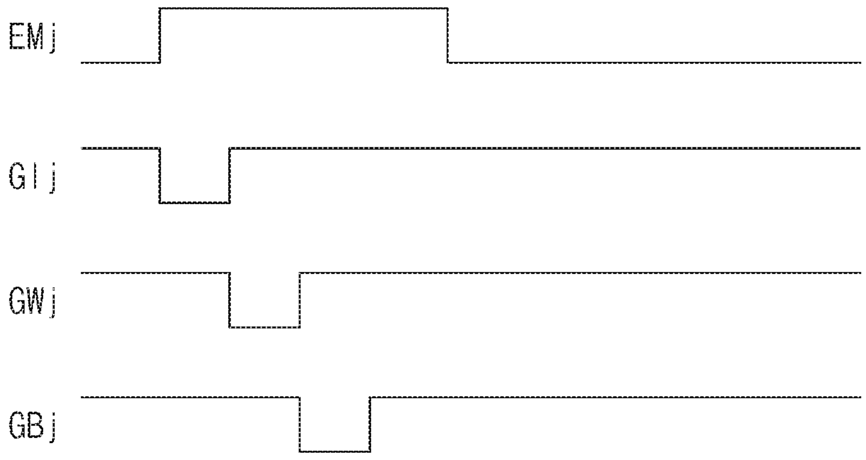
FIG. 3 is a waveform diagram showing driving signals used to drive the pixel shown in FIG. 2.

FIG. 2 is an equivalent circuit diagram showing a pixel of an organic light emitting display device according to an exemplary embodiment of the present disclosure. FIG. 3 is a waveform diagram showing driving signals used to drive the pixel shown in FIG. 2.

FIG. 2 shows an equivalent circuit of an i-th data lines 171 among the data lines DL1 to DLm, a j-th scan line 151 among the scan lines SL1 to SLn, a j-th light emitting control line 153 among the light emitting lines EL1 to ELn, and a pixel PXij connected to a j-th driving voltage line BMLj among the driving voltage lines BML1 to BMLn as a representative example. Each of the pixels PX shown in FIG. 1 may have the same circuit configuration as the equivalent circuit of the pixel PXij shown in FIG. 2. In the present exemplary embodiment, the circuit part of the pixel PXij includes seven transistors T1 to T7 and one capacitor Cst. In addition, the first to seventh transistors T1 to T7 may be a p-channel type transistor such as PMOS, however they should not be limited thereto or thereby. That is, at least one of the first to seventh transistors T1 to T7 may be an n-channel type transistor. In addition, the configuration of the pixel according to the present disclosure should not be limited to that shown in FIG. 2. The circuit part shown in FIG. 2 is merely exemplary, and the configuration of the circuit part may vary.

Referring to FIG. 2, the pixel PXij according to the exemplary embodiment includes signal lines 151, 152, 153, 154, 171, PL, and BMLj. The pixel PXij includes the first to seventh transistors T1, T2, T3, T4, T5, T6, and T7 connected to the signal lines 151, 152, 153, 154, 171, PL, and BMLj, the capacitor Cst, and at least one light emitting diode ED. In the present exemplary embodiment, one pixel PXij including one light emitting diode ED will be described as a representative example.

The signal lines 151, 152, 153, 154, 171, PL and BMLj may include the scan lines 151, 152, and 154, the light emitting control line 153, the data line 171, the first driving voltage line PL, and the third driving voltage line BMLj.

The scan lines 151, 152, and 154 may transmit scan signals GWj, GIj and GBj, respectively. The scan signals GWj, GIj and GBj may transmit a gate-on voltage and a gate-off voltage to turn on or off the transistors T2, T3, T4, and T7 included in the pixel PXij.

The scan lines 151, 152 and 154 connected to the pixel PXij may include a first scan line 151 that transmits the scan signal GWj, a second scan line 152 that transmits the scan signal GIj having the gate-on voltage at a different timing from the first scan line 151, and a third scan line 154 that transmits the scan signal GBj. In the present exemplary embodiment, an example in which the second scan line 152 transmits the gate-on voltage at a timing faster than the first scan line 151 will be mainly described. For example, in a case where the scan signal GWj is a j-th scan signal Sj (j is a natural number equal to or greater than 1) among the scan signals applied during one frame period, the scan signal GIj may be a previous scan signal such as a (j−1)th scan signal S(j−1), and the scan signal GBj may be a (j+1)th scan signal S(j+1), however the present disclosure should not be limited thereto or thereby. That is, the scan signal GBj may be a scan signal rather than the (j+1)th scan signal S(j+1).

The light emitting control line 153 may transmit the control signal and particularly may transmit the light emitting control signal used to control the light emission of the light emitting diode ED included in the pixel PXij. The light emitting control signal transmitted through the light emitting control line 153 may have a different waveform from the scan signals transmitted through the scan lines 151, 152, and 154. The data line 171 transmits the data signal Di, and the first driving voltage line PL transmits the first driving voltage ELVDD. The data signal Di may have a voltage level varied depending on the image signal input to the display device, and the first driving voltage ELVDD may have a substantially constant level.

The first scan line 151 may transmit the scan signal GWj to the second transistor T2 and the third transistor T3, the second scan line 152 may transmit the scan signal GIj to the fourth transistor T4, the third scan line 154 may transmit the scan signal GBj to the seventh transistor T7, and the light emitting control line 153 may transmit the light emitting control signal Ej to the fifth transistor T5 and the sixth transistor T6.

A first gate electrode G1 of the first transistor T1 is connected to one end of the capacitor Cst, a first source electrode S1 of the first transistor T1 is connected to the first driving voltage line PL via the fifth transistor T5, and a first drain electrode D1 of the first transistor T1 is electrically connected to an anode of the light emitting diode ED via the sixth transistor T6. The first transistor T1 receives the data signal Di transmitted through the data line 171 in response to a switching operation of the second transistor T2 and supplies a driving current Id to the light emitting diode ED.

A second gate electrode G2 of the second transistor T2 is connected to the first scan line 151, a second source electrode S2 of the second transistor T2 is connected to the data line 171, and a second drain electrode D2 of the second transistor T2 is connected to the source electrode S1 of the first transistor T1 and to the first driving voltage line PL through the fifth transistor T5. The second transistor T2 is turned on in response to the scan signal GWj applied thereto through the first scan line 151 and transmits the data signal Di provided through the data line 171 to the source electrode S1 of the first transistor T1.

In the present exemplary embodiment, the second transistor T2 has a dual gate structure including a lower gate electrode BG2 in addition to the gate electrode G2. The lower gate electrode BG2 of the second transistor T2 is connected to the third driving voltage line BMLj.

A third gate electrode G3 of the third transistor T3 is connected to the first scan line 151. A third drain electrode D3 of the third transistor T3 is commonly connected to a drain electrode D4 of the fourth transistor T4, the one end of the capacitor Cst, and the first gate electrode G1 of the first transistor T1. A third source electrode S3 of the third transistor T3 is connected to the drain electrode D1 of the first transistor T1 and to the anode of the light emitting diode ED through the sixth transistor T6.

The third transistor T3 is turned on in response to the scan signal GWj applied thereto through the first scan line 151 to connect the first gate electrode G1 and the drain electrode D1 of the first transistor T1, and thus the first transistor T1 is connected in a diode configuration.

A fourth gate electrode G4 of the fourth transistor T4 is connected to the second scan line 152, a fourth source electrode S4 of the fourth transistor T4 is connected to the initialization voltage line RL transmitting the initialization voltage Vint, and a fourth drain electrode D4 of the fourth transistor T4 is connected to the one end of the capacitor Cst and the first gate electrode G1 of the first transistor T1 through the third drain electrode D3 of the third transistor T3. The fourth transistor T4 is turned on in response to the scan signal GIj applied thereto through the second scan line 152 and transmits the initialization voltage Vint to the first gate electrode G1 of the first transistor T1 to perform an initialization operation that initializes the voltage of the first gate electrode G1.

A fifth gate electrode G5 of the fifth transistor T5 is connected to the light emitting control line 153, a fifth source electrode S5 of the fifth transistor T5 is connected to the first driving voltage line PL, and a fifth drain electrode D5 of the fifth transistor T5 is connected to the first source electrode S1 of the first transistor T1 and the second drain electrode D2 of the second transistor T2.

A sixth gate electrode G6 of the sixth transistor T6 is connected to the light emitting control line 153, a sixth source electrode S6 of the sixth transistor T6 is connected to the first drain electrode D1 of the first transistor T1 and the third source electrode S3 of the third transistor T3, and a sixth drain electrode D6 of the sixth transistor T6 is electrically connected to the anode of the light emitting diode ED. The fifth transistor T5 and the sixth transistor T6 are substantially simultaneously turned on in response to the light emitting control signal Ej applied thereto through the light emitting control line 153, and the first driving voltage ELVDD is compensated by the first transistor T1 connected to the diode and transmitted to the light emitting diode ED.

A seventh gate electrode G7 of the seventh transistor T7 is connected to the third scan line 154, a seventh source electrode S7 of the seventh transistor T7 is connected to the sixth drain electrode D6 of the sixth transistor T6 and the anode of the light emitting diode ED, and a seventh drain electrode D7 of the seventh transistor T7 is connected to the initialization voltage line RL and the fourth source electrode S4 of the fourth transistor T4. According to another embodiment, the seventh gate electrode G7 of the seventh transistor T7 may be connected to the second scan line 152.

The one end of the capacitor Cst is connected to the first gate electrode G1 of the first transistor T1 as described above, and the other end of the capacitor Cst is connected to the first driving voltage line PL. A cathode of the light emitting diode ED may be connected to a terminal that transmits the second driving voltage ELVSS. The configuration of the pixel PXij according to the exemplary embodiment should not be limited to that shown in FIG. 2, and the number of the transistors, the number of the capacitors, which are included in the pixel PXij, and a connection relation of the transistors and the capacitors may be changed in various ways.

The operation of the display device according to the exemplary embodiment will be described with reference to FIGS. 2 and 3. In the following descriptions, the first to seventh transistors T1 to T7 are described as the p-channel type transistor, and the operation corresponding to one frame period will be described.

Referring to FIGS. 2 and 3, the scan signals Sj−1, Sj, and Sj+1 having a low level may be sequentially applied to the first scan line 151 connected to the pixel PXij as the scan signal GWj during one frame period.

The scan signal GIj having the low level is provided to the fourth transistor T4 through the second scan line 152 during an initialization period. The scan signal GIj may be, for example, the (j−1)th scan signal Sj−1. The fourth transistor T4 is turned on in response to the scan signal GIj having the low level, the initialization voltage Vint is applied to the first gate electrode G1 of the first transistor T1 through the fourth transistor T4, and the first transistor T1 is initialized by the initialization voltage Vint.

Then, when the scan signal GWj having the low level is provided through the first scan line 151 during a data programming and compensation period, the second transistor T2 and the third transistor T3 are turned on in response to the scan signal GWj having the low level. The scan signal GWj may be, for example, the j-th scan signal Sj. In this case, the first transistor T1 is connected in the diode configuration by the turned-on third transistor T3 and is forward biased. Accordingly, a compensation voltage Di-Vth obtained by decreasing the data signal Di provided through the data line 171 by the threshold voltage Vth of the first transistor T1 is applied to the first gate electrode G1 of the first transistor T1. That is, a gate voltage applied to the first gate electrode G1 of the first transistor T1 may be the compensation voltage Di-Vth.

The first driving voltage ELVDD and the compensation voltage Di-Vth are applied to both ends of the capacitor Cst, and the capacitor Cst stores electric charges corresponding to a difference in voltage between the both ends of the capacitor Cst.

The seventh transistor T7 is turned on in response to the scan signal GBj having the low level, which is applied thereto through the third scan line 154, during a bypass period. The scan signal GBj may be the (j+1)th scan signal Sj+1. Due to the turned-on seventh transistor T7, a portion of the driving current Id may be discharged through the seventh transistor T7 as a bypass current Ibp.

When the light emitting diode ED emits the light even in the case where a minimum current of the driving transistor T1 displaying a black image flows as a driving current, the black image is not appropriately displayed. Therefore, the bypass transistor T7 of the organic light emitting display device according to an exemplary embodiment may disperse some of the minimum current of the driving transistor T1 as the bypass current Ibp to a current path other than a current path toward the light emitting diode. Here, the minimum current of the driving transistor T1 indicates a current in a condition in which a gate-source voltage Vgs of the driving transistor T1 is less than the threshold voltage Vth, such that the driving transistor T1 is turned off. The minimum driving current (for example, a current of about 10 pA or less) in the condition in which the driving transistor T1 is turned off is transferred to the light emitting diode ED, such that an image having a black brightness is displayed. In the case where the minimum driving current displaying the black image flows, an influence of a bypass transfer of the bypass current Ibp is large. On the other hand, in the case where a large driving current displaying an image such as a general image or a white image flows, an influence of the bypass current Ibp may be hardly present. Therefore, in the case where the driving current displaying the black image flows, a light emitting current Ied of the light emitting diode ED decreased from the driving current Id by an amount of the bypass current Ibp exiting through the bypass transistor T7 has a minimum current amount, which is a level that may certainly display the black image. Therefore, an accurate black brightness image is implemented using the bypass transistor T7, thereby making it possible to improve a contrast ratio. In the present exemplary embodiment, the scan signal GBj that is bypass signal is the same as the next scan signal Sj+1, but it should not be limited thereto or thereby.

Then, a level of the light emitting control signal Ej provided through the light emitting control line 153 is changed from a high level to a low level during a light emitting period. The fifth transistor T5 and the sixth transistor T6 are turned on in response to the light emitting control signal Ej during the light emitting period. Accordingly, the driving current Id is generated due to the voltage difference between the gate voltage of the first gate electrode G1 of the first transistor T1 and the first driving voltage ELVDD, the driving current Id is supplied to the light emitting diode ED through the sixth transistor T6, and thus the light emitting current led flows through the light emitting diode ED. During the light emitting period, the gate-source voltage Vgs of the first transistor T1 is maintained in the following of '(Di-Vth)-ELVDD' by the capacitor Cst, and the driving current Id may be in proportion to '(Di-ELVDD)' corresponding to a square of a value obtained by subtracting the threshold voltage from the gate-source voltage according to a current-voltage relationship of the first transistor T1. Accordingly, the driving current Id may be determined in regardless of the threshold voltage Vth of the first transistor T1.

Hereinafter, the structure of the pixel will be described in detail with reference to FIGS. 4 and 5. For the convenience of understanding, the planar structure in the plan view of the pixel will be mainly described, and then the cross-sectional structure of the pixel will be described in detail.

Figure 4:
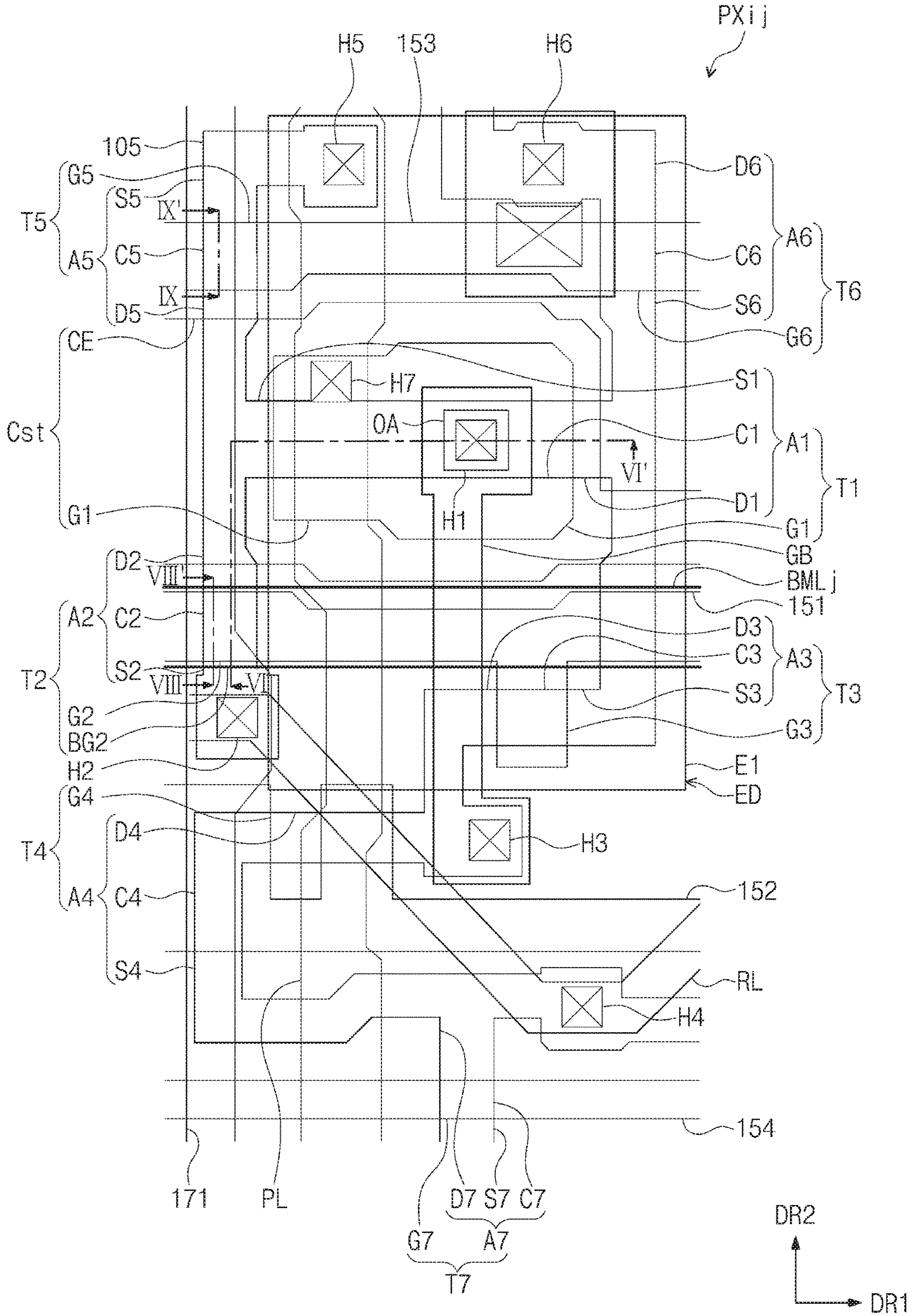
FIG. 4 is a plan view showing one pixel of an organic light emitting display device according to an exemplary embodiment of the present disclosure.

FIG. 4 is a plan view showing one pixel of an organic light emitting display device according to an exemplary embodiment of the present disclosure. FIG. 5 is a cross-sectional view taken along a line VI-VI' of FIG. 4 to show the organic light emitting display device.

The pixel PXij according to an embodiment may include a first conductive layer including the first scan line 151 transmitting the scan signal GWj, the second scan line 152 transmitting the scan signal GIj, the third scan line 154 transmitting the scan signal GBj, and the light emitting control line 153 transmitting the light emitting control signal Ej. The first conductive layer is located on one surface of the substrate 110. The substrate 110 may include an inorganic or organic insulating material, such as glass, plastic, or the like, and may have flexibility.

The scan lines 151, 152, and 154, the light emitting control line 153, and the third driving voltage line BMLj may extend in the same direction (e.g., the first direction DR1) when viewed in a plan view. The first scan line 151 may be disposed between the second scan line 152 and the light emitting control line 153 when viewed in a plan view.

The pixel PXij of the display device according to an exemplary embodiment may further include a second conductive layer including a capacitor electrode CE and the initialization voltage line RL. The second conductive layer is disposed on a different layer from the first conductive layer when viewed in a cross section. For example, the second conductive layer may be disposed above the first conductive layer when viewed in a cross section.

The capacitor electrode CE and the initialization voltage line RL extend in substantially the same direction (e.g., the first direction DR1) as the scan lines 151, 152, and 154 when viewed in a plan view.

The pixel PXij according to an embodiment may further include a third conductive layer including the data line 171 transmitting the data signal Di and the first driving voltage line PL transmitting the first driving voltage ELVDD. The third conductive layer is disposed on a different layer from the first conductive layer and the second conductive layer when viewed in a cross section. For example, the third conductive layer may be disposed above the second conductive layer, may include the same material, and may be disposed on the same layer.

The data line 171 and the first driving voltage line PL may extend in substantially the same direction (e.g., the second direction DR2) when viewed in a plan view and may cross the scan lines 151, 152, and 154, the light emitting control line 153, the initialization voltage line RL, and the capacitor electrode CE.

The pixel PXij may include the first to seventh transistors T1 to T7 and the capacitor Cst, which are connected to the scan lines 151, 152, and 154, the light emitting control line 153, the data line 171, and the first driving voltage line PL, and the light emitting diode ED.

The channel of each of the first to seventh transistors T1 to T7 may be formed in one active pattern 105, and the active pattern 105 may be bent into various shapes. The active pattern 105 may include a semiconductor material, such as polycrystalline silicon or oxide semiconductor. The active pattern 105 may be disposed between the substrate 110 and the first conductive layer when viewed in a cross section.

The active pattern 105 includes first to seventh active patterns A1 to A7 respectively corresponding to the first to seventh transistors T1 to T7. The first active pattern A1 includes a first source electrode S1, a first channel C1, and a first drain electrode D. The first source electrode S1 is connected to the second drain electrode D2 of the second transistor T2 and the fifth drain electrode D5 of the fifth transistor T5, and the first drain electrode D1 is connected to the third source electrode S3 of the third transistor 3 and the sixth source electrode S6 of the sixth transistor T6.

The first active pattern A1 may include polycrystalline silicon or oxide semiconductor. The oxide semiconductor may include one of an oxide based on titanium (T1), hafnium (Hf), zirconium (Zr), aluminum (Al), tantalum (Ta), germanium (Ge), zinc (Zn), gallium (Ga), tin (Sn), or indium (In) and complex oxides thereof, such as zinc oxide (ZnO), indium-gallium-zinc oxide (In—Ga—Zn—O), indium-zinc oxide (Zn—In—O), zinc-tin oxide (Zn—Sn—O), indium-gallium oxide (In—Ga—O), indium-tin oxide (In—Sn—O), indium-zirconium oxide (In—Zr—O), indium-zirconium-zinc oxide (In—Zr—Zn—O), indium-zirconium-tin oxide (In—Zr—Sn—O), indium-zirconium-gallium oxide (In—Zr—Ga—O), indium-aluminum oxide (In—Al—O), indium-zinc-aluminum oxide (In—Zn—Al—O), indium-tin-aluminum oxide (In—Sn—Al—O), indium-aluminum-gallium oxide (In—Al—Ga—O), indium-tantalum oxide (In—Ta—O), indium-tantalum-zinc oxide (In—Ta—Zn—O), indium-tantalum-tin oxide (In—Ta—Sn—O), indium-tantalum-gallium oxide (In—Ta—Ga—O), indium-germanium oxide (In—Ge—O), indium-germanium-zinc oxide (In—Ge—Zn—O), indium-germanium-tin oxide (In—Ge—Sn—O), indium-germanium-gallium oxide (In—Ge—Ga—O), titanium-indium-zinc oxide (Ti—In—Zn—O), and hafnium-indium-zinc oxide (Hf—In—Zn—O). In the case where the first active pattern A1 includes the oxide semiconductor, an additional protective layer may be added to protect the oxide semiconductor that is vulnerable to external environment, e.g., high temperature.

A first channel C1 of the first active pattern A1 may be channel-doped with an n-type impurity or a p-type impurity, and the first source electrode S1 and the first drain electrode D1 may be spaced apart from each other such that the first channel C1 is disposed therebetween and may be doped with a doping impurity opposite to the doping impurity provided to the first channel C1.

The first gate electrode G1 is disposed above the first channel C1 of the first active pattern A1 and has an island shape. The first gate electrode G1 is connected to the fourth drain electrode D4 of the fourth transistor T4 and the third drain electrode D3 of the third transistor T3 by a gate bridge GB through a contact hole H1 and a contact hole H3. The first gate electrode G1 overlaps with the capacitor electrode CE, acts as the gate electrode of the first transistor T1, and acts as one electrode of the capacitor Cst. That is, the first gate electrode G1 forms the capacitor Cst with the capacitor electrode CE.

The second transistor T2 is disposed above the substrate 110 and includes a second active pattern A2 and the second gate electrode G2. The second active pattern A2 includes the second source electrode S2, a second channel C2, and the second drain electrode D2. The second source electrode S2 is connected to the data line 171 through a contact hole H2, and the second drain electrode D2 is connected to the first source electrode S1 of the first transistor T1. The second channel C2 that is a channel area of the second active pattern A2 overlapped with the second gate electrode G2 is disposed between the second source electrode S2 and the second drain electrode D2. That is, the second active pattern A2 is connected to the first active pattern A1.

The lower gate electrode BG2 is disposed between the second active pattern A2 and the substrate 110. The lower gate electrode BG2 is integrally formed with the third driving voltage line BMLj. The second channel C2 of the second active pattern A2 overlaps with the third driving voltage line BMLj, the third driving voltage VGH is applied to the third driving voltage line BMLj, and electric charges, such as electrons or holes, are accumulated in the second channel C2 of the second active pattern A2 in accordance with a polarity of the power source supplied to the third driving voltage line BMLj, thereby controlling a threshold voltage of the second transistor T2.

That is, the threshold voltage of the second transistor T2 may decrease or increase using the third driving voltage line BMLj, and a hysteresis phenomenon of the second transistor T2 may be improved by controlling the threshold voltage of the second transistor T2.

In the present exemplary embodiment, the third driving voltage line BMLj is disposed under the first scan line 151. A width in the second direction DR2 of the third driving voltage line BMLj is wider than a width in the second direction DR2 of the first scan line 151.

The second channel C2 of the second active pattern A2 may be channel-doped with the n-type impurity or the p-type impurity, and the second source electrode S2 and the second drain electrode D2 may be spaced apart from each other such that the second channel C2 is disposed therebetween and may be doped with a doping impurity opposite to the doping impurity provided to the second channel C2. The second active pattern A2 is disposed on the same layer as the first active pattern A1, includes the same material as the first active pattern A1, and is integrally formed with the first active pattern A1.

The second gate electrode G2 is disposed above the second channel C2 of the second active pattern A2 and is integrally formed with the first scan line 151.

The lower gate electrode, i.e., the third driving voltage line BMLj is not disposed between the first active pattern A1 and the substrate 110. In other words, the first channel C1 of the first active pattern A1 does not overlap with the third driving voltage line BMLj.

The third transistor T3 is disposed above the substrate 110 and includes a third active pattern A3 and the third gate electrode G3.

The third active pattern A3 includes the third source electrode S3, a third channel C3, and the third drain electrode D3. The third source electrode S3 is connected to the first drain electrode D1, and the third drain electrode D3 is connected to the first gate electrode G1 of the first transistor T1 by a gate bridge GB provided in a contact hole H3. The third channel C3 that is a channel area of the third active pattern A3 overlapped with the third gate electrode G3 is disposed between the third source electrode S3 and the third drain electrode D3. That is, the third active pattern A3 connects to the first active pattern A1 and the first gate electrode G1.

The third channel C3 of the third active pattern A3 may be channel-doped with the n-type impurity or the p-type impurity, and the third source electrode S3 and the third drain electrode D3 may be spaced apart from each other such that the third channel C3 is disposed therebetween and may be doped with a doping impurity opposite to the doping impurity provided to the third channel C3. The third active pattern A3 is disposed on the same layer as the first active pattern A1 and the second active pattern A2, includes the same material as the first active pattern A1 and the second active pattern A2, and is integrally formed with the first active pattern A1 and the second active pattern A2. The third gate electrode G3 is disposed above the third channel C3 of the third active pattern A3 and is integrally formed with the first scan line 151.

The fourth transistor T4 is disposed above the substrate 110 and includes a fourth active pattern A4 and the fourth gate electrode G4.

The fourth active pattern A4 includes the fourth source electrode S4, a fourth channel C4, and the fourth drain electrode D4. The fourth source electrode S4 is connected to the initialization voltage line RL through the contact hole H4, and the fourth drain electrode D4 is connected to the first gate electrode G1 of the first transistor T1 by the gate bridge GB through the contact hole H3. The fourth channel C4 that is a channel area of the fourth active pattern A4 overlapped with the fourth gate electrode G4 is disposed between the fourth source electrode S4 and the fourth drain electrode D4. That is, the fourth active pattern A4 connects to the initialization voltage line RL and the first gate electrode G1 and is connected to the third active pattern A3 and the first gate electrode G1.

The fourth channel C4 of the fourth active pattern A4 may be channel-doped with the n-type impurity or the p-type impurity, and the fourth source electrode S4 and the fourth drain electrode D4 may be spaced apart from each other such that the fourth channel C4 is disposed therebetween and may be doped with a doping impurity opposite to the doping impurity provided to the fourth channel C4. The fourth active pattern A4 is disposed on the same layer as the first active pattern A1, the second active pattern A2, and the third active pattern A3, includes the same material as the first active pattern A1, the second active pattern A2, and the third active pattern A3, and is integrally formed with the first active pattern A1, the second active pattern A2, and the third active pattern A3. The fourth gate electrode G4 is disposed above the fourth channel C4 of the fourth active pattern A4 and is integrally formed with the second scan line 152.

The fifth transistor T5 is disposed above the substrate 110 and includes a fifth active pattern A5 and the fifth gate electrode G5.

The fifth active pattern A5 includes the fifth source electrode S5, a fifth channel C5, and the fifth drain electrode D5. The fifth source electrode S5 is connected to the first driving voltage line PL through a contact hole H5, and the fifth drain electrode D5 is connected to the first source electrode S1 of the first transistor T1. The fifth channel C5 that is a channel area of the fifth active pattern A5 overlapped with the fifth gate electrode G5 is disposed between the fifth source electrode S5 and the fifth drain electrode D5. That is, the fifth active pattern A5 connects the first driving voltage line PL and the first active pattern A1.

The fifth channel C5 of the fifth active pattern A5 may be channel-doped with the n-type impurity or the p-type impurity, and the fifth source electrode S5 and the fifth drain electrode D5 may be spaced apart from each other such that the fifth channel C5 is disposed therebetween and may be doped with a doping impurity opposite to the doping impurity provided to the fifth channel C5. The fifth active pattern A5 is disposed on the same layer as the first active pattern A1, the second active pattern A2, the third active pattern A3, and the fourth active pattern A4, includes the same material as the first active pattern A1, the second active pattern A2, the third active pattern A3, and the fourth active pattern A4, and is integrally formed with the first active pattern A1, the second active pattern A2, the third active pattern A3, and the fourth active pattern A4.

The fifth gate electrode G5 is disposed above the fifth channel C5 of the fifth active pattern A5 and is integrally formed with the light emitting control line 153.

The sixth transistor T6 is disposed above the substrate 110 and includes a sixth active pattern A6 and the sixth gate electrode G6.

The sixth active pattern A6 includes the sixth source electrode S6, a sixth channel C6, and the sixth drain electrode D6. The sixth source electrode S6 is connected to the first drain electrode D1 of the first transistor T1, and the sixth drain electrode D6 is connected to the first electrode E1 of the light emitting diode ED through a contact hole H6. The sixth channel C6 that is a channel area of the sixth active pattern A6 overlapped with the sixth gate electrode G6 is disposed between the sixth source electrode S6 and the sixth drain electrode D6. That is, the sixth active pattern A6 connects the first active pattern A1 and the first electrode E1 of the light emitting diode ED.

The sixth channel C6 of the sixth active pattern A6 may be channel-doped with the n-type impurity or the p-type impurity, and the sixth source electrode S6 and the sixth drain electrode D6 may be spaced apart from each other such that the sixth channel C6 is disposed therebetween and may be doped with a doping impurity opposite to the doping impurity provided to the sixth channel C6. The sixth active pattern A6 is disposed on the same layer as the first active pattern A1, the second active pattern A2, the third active pattern A3, the fourth active pattern A4, and the fifth active pattern A5, includes the same material as the first active pattern A1, the second active pattern A2, the third active pattern A3, the fourth active pattern A4, and the fifth active pattern A5, and is integrally formed with the first active pattern A1, the second active pattern A2, the third active pattern A3, the fourth active pattern A4, and the fifth active pattern A5.

The sixth gate electrode G6 is disposed above the sixth channel C6 of the sixth active pattern A6 and is integrally formed with the light emitting control line 153.

The seventh transistor T7 is disposed above the substrate 110 and includes a seventh active pattern A7 and the seventh gate electrode G7.

The seventh active pattern A7 includes the seventh source electrode S7, a seventh channel C7, and the seventh drain electrode D7. The seventh source electrode S7 is connected to a first electrode of an organic light emitting element ED, and the seventh drain electrode D7 is connected to the fourth source electrode S4 of the fourth transistor T4. The seventh channel C7 that is a channel area of the seventh active pattern A7 overlapped with the seventh gate electrode G7 is disposed between the seventh source electrode S7 and the seventh drain electrode D7. That is, the seventh active pattern A7 connects the first electrode of the organic light emitting element and the fourth active pattern A4.

The seventh channel C7 of the seventh active pattern A7 may be channel-doped with the n-type impurity or the p-type impurity, and the seventh source electrode S7 and the seventh drain electrode D7 may be spaced apart from each other such that the seventh channel C7 is disposed therebetween and may be doped with a doping impurity opposite to the doping impurity provided to the seventh channel C7. The seventh active pattern A7 is disposed on the same layer as the first active pattern A1, the second active pattern A2, the third active pattern A3, the fourth active pattern A4, the fifth active pattern A5, and the sixth active pattern A6, includes the same material as the first active pattern A1, the second active pattern A2, the third active pattern A3, the fourth active pattern A4, the fifth active pattern A5, and the sixth active pattern A6, and is integrally formed with the first active pattern A1, the second active pattern A2, the third active pattern A3, the fourth active pattern A4, the fifth active pattern A5, and the sixth active pattern A6.

The seventh gate electrode G7 is disposed above the seventh channel C7 of the seventh active pattern A7 and is integrally formed with the third scan line 154.

As described above, the lower gate electrode BG2 integrally formed with the third driving voltage line BMLj is disposed between the second active pattern A2 of the second transistor T2 and the substrate 110, but the lower gate electrode BG2, i.e., the third driving voltage line BMLj is not disposed between the substrate 110 and the active patterns A1, A3, A4, A5, A6, and A7 of the first, third, fourth, fifth, sixth, and seventh transistors T1, T3, T4, T5, T6, and T7.

The capacitor Cst includes the one electrode and the other electrode, which face each other such that the insulating layer is disposed between the electrodes. The one electrode may be the capacitor electrode CE, and the other electrode may be the first gate electrode G1. The capacitor electrode CE is disposed above the first gate electrode G1 and connected to the first driving voltage line PL through the contact hole H7. The capacitor electrode CE and the first gate electrode G1 may be formed of the same or different metal materials on different layers from each other.

The capacitor electrode CE includes an opening OA overlapped with a portion of the first gate electrode G1, and the gate bridge GB is connected to the first gate electrode G1 through the opening OA.

The gate bridge GB is disposed on the first scan line 151, spaced apart from the first driving voltage line PL, is connected to the third drain electrode D3 of the third active pattern A3 and the fourth drain electrode D4 of the fourth active pattern A4 through the contact hole H3, and is connected to the first gate electrode G1 through the contact hole H1 formed through the opening OA of the capacitor electrode CE.

The initialization voltage line RL is connected to the fourth source electrode S4 of the fourth active pattern A4 through the contact hole H4. The initialization voltage line RL is disposed on the same layer as and includes as the same material as the first electrode E1 of the light emitting diode ED. Meanwhile, the initialization voltage line RL may be disposed on a different layer from and may include a different material from the first electrode E1 according to another embodiment of the present disclosure.

The structure of the display device according to the exemplary embodiment in the cross section will be described in detail with reference to FIG. 5.

A buffer layer 120 may be disposed on the substrate 110. The buffer layer 120 prevents impurities from being transferred to an upper layer of the buffer layer 120 from the substrate 110, particularly, to the active pattern 105 to improve characteristics of the active pattern 105 and relieve stress. The buffer layer 120 may include an inorganic insulating material and/or an organic insulating material, such as silicon nitride (SiNx) or silicon oxide (SiOx). At least a portion of the buffer layer 120 may be omitted.

The lower gate electrode BG2 as described above is disposed on the buffer layer 120, and the first insulating layer 130 is disposed on the lower gate electrode BG2. The lower gate electrode BG2 includes the metal material, however it should not be limited to the metal material. That is, the lower gate electrode BG2 may include other materials that may be used to supply the power, e.g., a conductive polymer. The active pattern 105 is disposed on the first insulating layer 130, and the second insulating layer 140 is disposed on the active pattern 105.

The above-mentioned first conductive layer may be disposed on the first insulating layer 130. The first conductive layer may include copper (Cu), aluminum (Al), molybdenum (Mo), titanium (T1), or alloys thereof.

A third insulating layer 150 may be disposed on the first conductive layer and the second insulating layer 140.

The above-mentioned second conductive layer may be disposed on the third insulating layer. The second conductive layer may include copper (Cu), aluminum (Al), molybdenum (Mo), titanium (T1), or alloys thereof.

A fourth insulating layer 160 may be disposed on the second conductive layer and the third insulating layer 150.

At least one of the first insulating layer 130, the second insulating layer 140, the third insulating layer 150, and the fourth insulating layer 160 may include an inorganic insulating material and/or an organic insulating material, such as silicon nitride (SiNx), silicon oxide (SiOx), or silicon oxynitride (SiOxNy).

The first insulating layer 130, the second insulating layer 140, the third insulating layer 150, and the fourth insulating layer 160 may include the contact H1 disposed above the first gate electrode G1, the contact hole H2 disposed above the second source electrode S2 of the second transistor T2, the contact hole H3 disposed above the third drain electrode D3 of the third transistor T3 and the fourth drain electrode D4 of the fourth transistor T4, the contact hole H4 disposed above the initialization voltage line RL, the contact hole H5 disposed above the fifth source electrode S5 of the fifth transistor T5, the contact hole H6 disposed above the sixth drain electrode D6 of the sixth transistor T6, and the contact hole H7 disposed above the capacitor electrode CE.

The above-mentioned third conductive layer may be disposed on the fourth insulating layer 160. The third conductive layer may include copper (Cu), aluminum (Al), molybdenum (Mo), titanium (T1), or alloys thereof.

The capacitor electrode CE is disposed to overlap with the first gate electrode G1, and the third insulating layer 150 is disposed between the capacitor electrode CE and the first gate electrode G1, thereby forming the capacitor Cst.

A protective layer 180 is disposed on the third conductive layer and the fourth insulating layer 160. The protective layer 180 may include an organic insulating material, such as a polyacryl-based resin or a polyimide-based resin, and an upper surface of the protective layer 180 may be flat.

The fourth conductive layer including the first electrode E1 may be disposed on the protective layer 180. The fourth conductive layer may include copper (Cu), aluminum (Al), molybdenum (Mo), titanium (T1), or alloys thereof. A pixel definition layer 190 may be disposed on the protective layer 180 and the fourth conductive layer. The pixel definition layer 190 is provided with an opening 191 defined therethrough above the pixel electrode E1.

An organic light emitting layer OL is disposed on the pixel electrode E1. The organic light emitting layer OL may be disposed in the opening 191. The organic light emitting layer OL may include an organic light emitting material or an inorganic light emitting material.

A second electrode E2 is disposed on the organic light emitting layer OL. The second electrode E2 may be formed on the pixel definition layer 190 and may extend over the plural pixels.

The first electrode E1, the organic light emitting layer OL, and the second electrode E2 form the light emitting diode ED.

An encapsulation layer (not shown) may further disposed on the second electrode E2 to protect the light emitting diode ED. The encapsulation layer may include an inorganic layer and an organic layer which are alternately stacked one on another.

The first electrode E1 is connected to the sixth drain electrode D6 of the sixth transistor T6 through a contact hole. The organic light emitting layer OL is disposed between the first electrode E1 and the second electrode E2. The second electrode E2 is disposed on the organic light emitting layer OL. At least one of the first electrode E1 and the second electrode E2 may be at least one of a light transmissive electrode, a light reflective electrode, and a light transflective electrode, and a light emitted from the organic light emitting layer OL may be emitted toward one or more of the first electrode E1 and the second electrode E2.

A capping layer may be disposed on the light emitting diode ED to cover the light emitting diode ED, and a thin film encapsulation layer or an encapsulation substrate may be disposed above the light emitting diode ED such that the capping layer is disposed therebetween.

Figure 6:
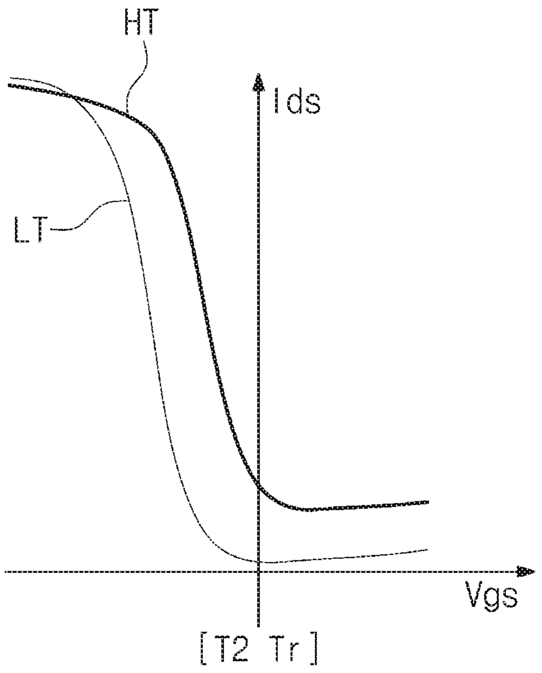
FIG. 6 is a view showing a variation of a threshold voltage of a second transistor shown in FIG. 2.

FIG. 6 is a view showing a variation of the threshold voltage of the second transistor shown in FIG. 2.

Referring to FIGS. 2 and 6, the threshold voltage of the second transistor T2 is positively shifted when an ambient temperature is changed from a room temperature to a high temperature (e.g., about 70 Celsius degrees). That is, a threshold voltage curve HT in the high temperature is more shifted to a positive direction (+ direction) than a threshold voltage curve LT in the room temperature. In the case where the threshold voltage of the second transistor T2 is positively shifted, a leakage current flowing through the second transistor T2 and the third transistor T3 may increase during the light emitting period in which the second transistor T2 and the third transistor T3 are required to maintain an off state. The leakage current flowing through the second transistor T2 and the third transistor T3 increases a voltage level of the first gate electrode G1 of the first transistor T1 and decreases the driving current Id supplied to the light emitting diode ED. As a result, a light emission brightness of the light emitting diode ED may be deteriorated.

The second transistor T2 according to the exemplary embodiment of the present disclosure includes the lower gate electrode BG2, and the third driving voltage VGH is applied to the lower gate electrode BG2 through the third driving voltage line BMLj. The third driving voltage VGH may be, for example, about 7 volts. For instance, when the third driving voltage VGH is about 7 volts, the threshold voltage of the second transistor T2 may be shifted by about −0.3 volts.

Accordingly, the light emission brightness of the light emitting diode ED may be prevented from being deteriorated by the positive shift of the threshold voltage of the light emitting diode ED.

Figure 7:
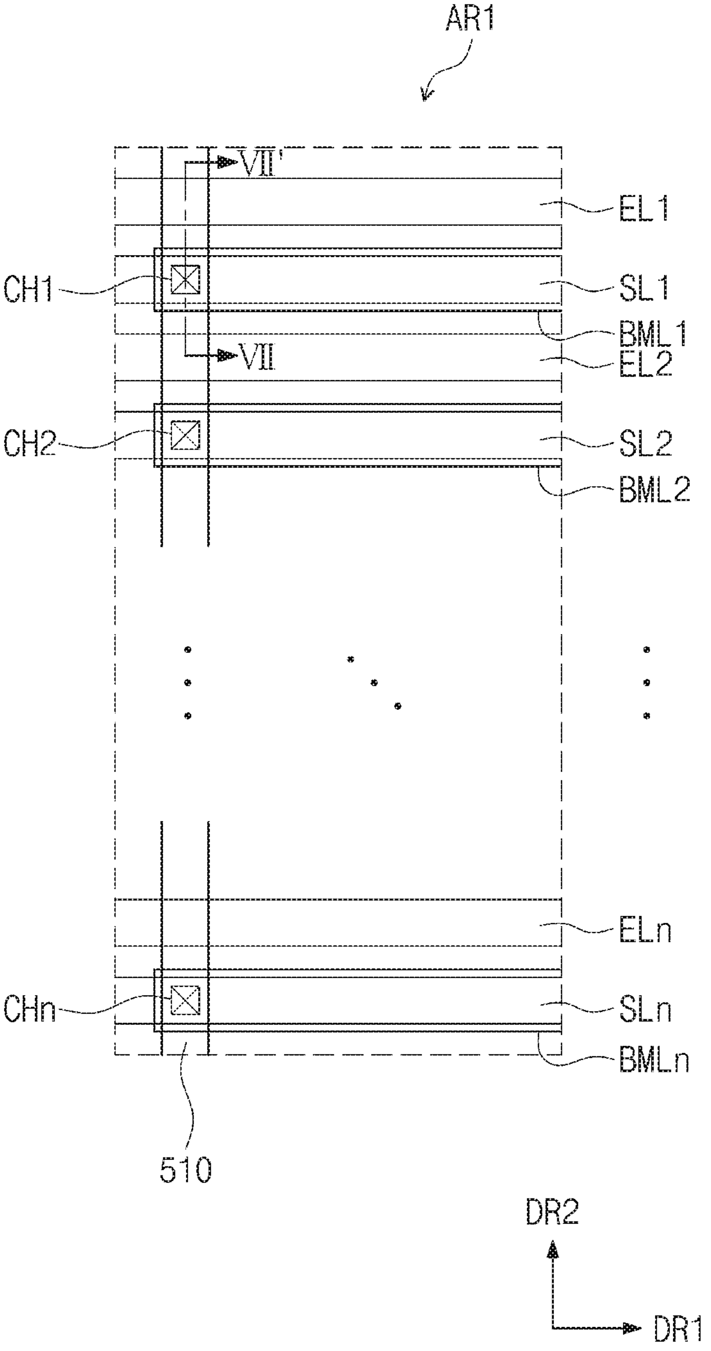
FIG. 7 is a plan view showing an AR1 area of the organic light emitting display device shown in FIG. 1.
Figure 8:
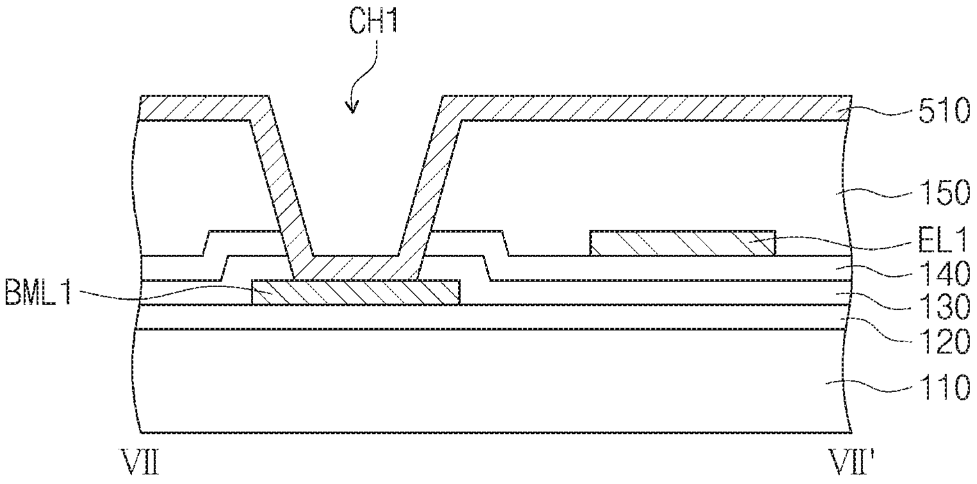
FIG. 8 is a cross-sectional view taken along a line VII-VII' of FIG. 7.

FIG. 7 is a plan view showing an AR1 area of the organic light emitting display device shown in FIG. 1. FIG. 8 is a cross-sectional view taken along a line VII-VII' of FIG. 7.

Referring to FIGS. 1, 7, and 8, the voltage line 510 transmitting the third driving voltage VGH from the voltage generator 500 extends in the second direction DR2. The light emitting lines EL1 to ELn and the scan lines SL1 to SLn extend in the first direction DR1 crossing the second direction DR2.

Each of the third driving voltage lines BML1 to BMLn may be arranged parallel to a corresponding scan line among the scan lines SL1 to SLn. In the present exemplary embodiment, each of the third driving voltage lines BML1 to BMLn is arranged under a corresponding scan line among the scan lines SL1 to SLn. In addition, the number of the third driving voltage lines BML1 to BMLn is equal to the number of the pixels arranged in the second direction DR2, i.e., the number of the scan lines SL1 to SLn.

The voltage line 510 is connected to the third driving voltage lines BML1 to BMLn through contact holes CH1 to CHn.

Figure 5:
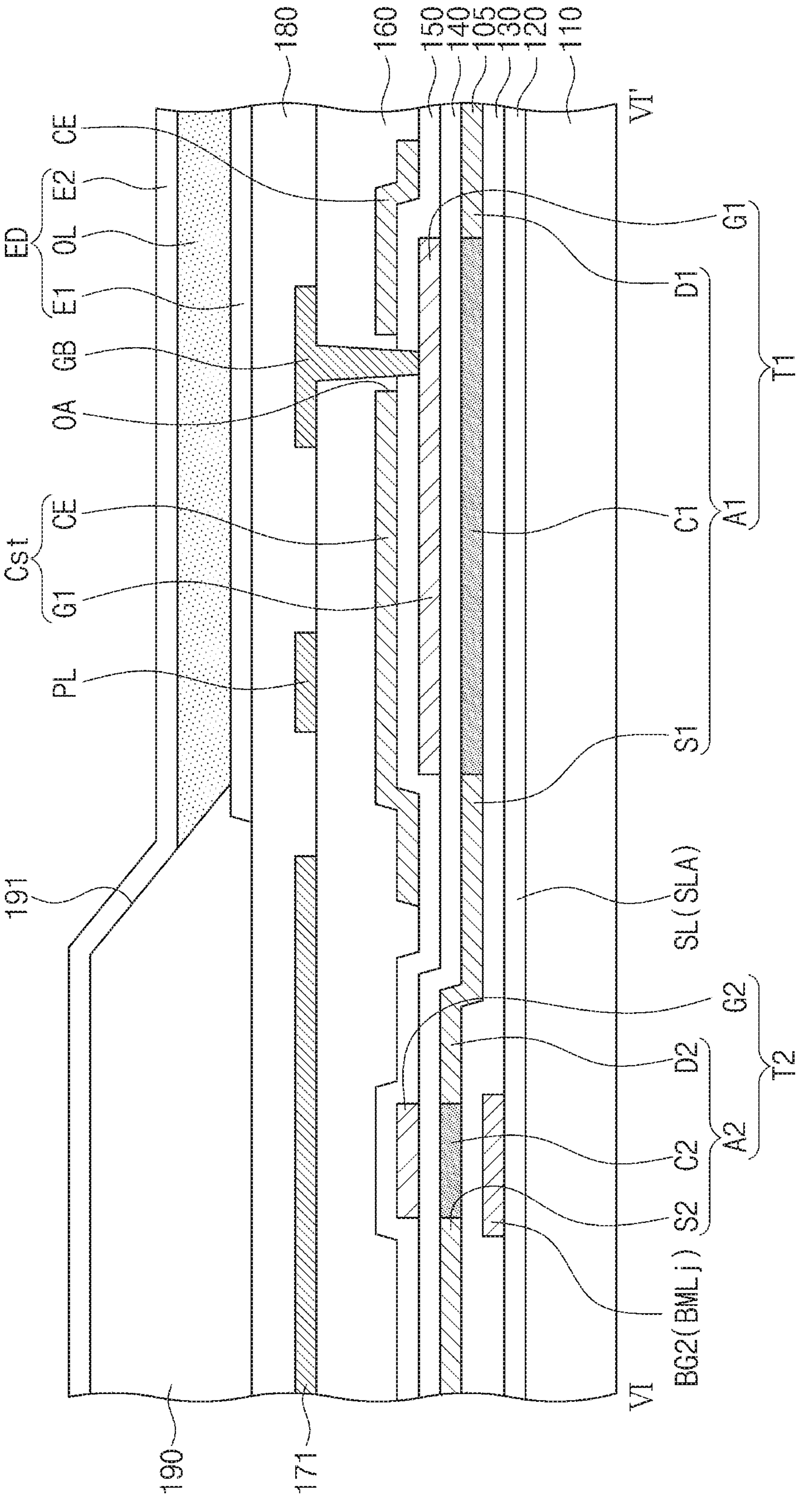
FIG. 5 is a cross-sectional view taken along a line VI-VI' of FIG. 4 to show the organic light emitting display device.

Referring to FIGS. 5, 7, and 8, the light emitting lines EL1 to ELn may include the same material as and may be disposed on the same layer as the light emitting control line 153. The voltage line 510 may be disposed in the second conductive layer including the capacitor electrode CE and the initialization voltage line RL. According to another embodiment, the voltage line 510 may be disposed in the third conductive layer including the data line 171 and the first driving voltage line PL transmitting the first driving voltage ELVDD.

FIGS. 9A to 9F are cross-sectional views taken along lines VIII-VIII' and IX-IX' of FIG. 4.

Figure 9A:
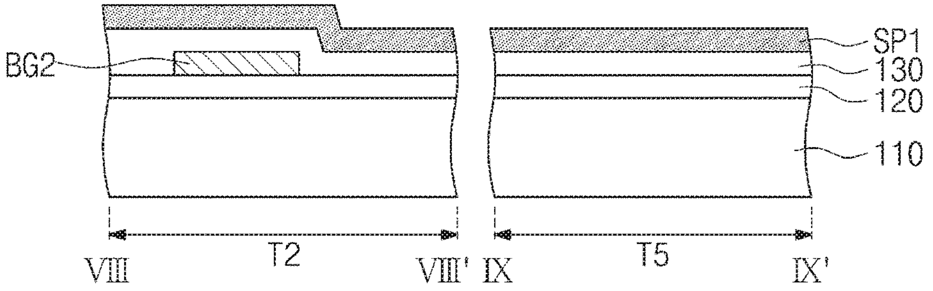
FIGS. 9A, 9B, 9C, 9D, 9E and 9F are cross-sectional views taken along lines VIII-VIII' and IX-IX' of FIG. 4.

Referring to FIG. 9A, the buffer layer 120 is formed on the substrate 110. The lower gate electrode BG2 is formed on the buffer layer 120. The first insulating layer 130 and an initial semiconductor pattern SP1 are formed on the lower gate electrode BG2. The initial semiconductor pattern SP1 may be formed by depositing a semiconductor material and patterning the semiconductor material. The initial semiconductor pattern SP1 may be formed by further performing a crystallization process, such as a heat treatment process.

Figure 9B:
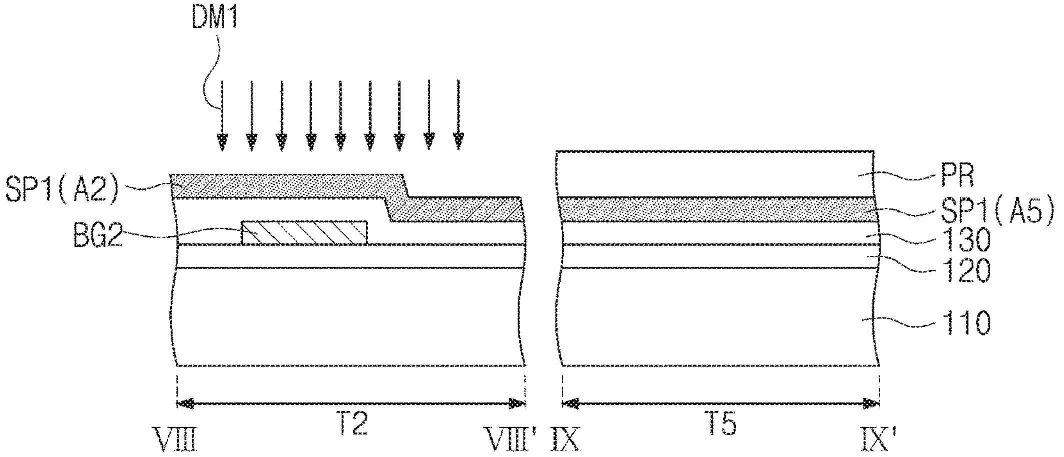

Then, as shown in FIG. 9B, a photoresist PR is uniformly coated on the initial semiconductor pattern SP1, and an area corresponding to the second active pattern A2 of the initial semiconductor pattern SP1 is doped with a first impurity DM1. As an example, the first impurity DM1 is a boron (B) ion.

Figure 9C:
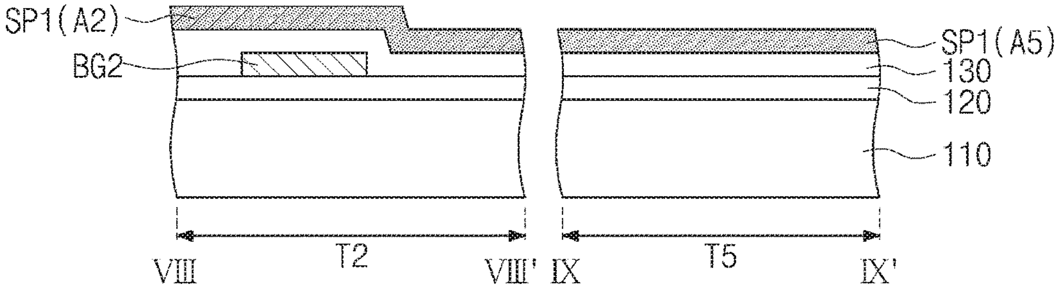

Then, as shown in FIG. 9C, the photoresist PR is remove. The area corresponding to the second active pattern A2 of the second transistor T2 of the initial semiconductor pattern SP1 is doped with the boron ion. The first impurity DM1 may be injected into the initial semiconductor pattern SP1 by a diffusion process or an ion injection process, however it should not be particularly limited.

Figure 9D:
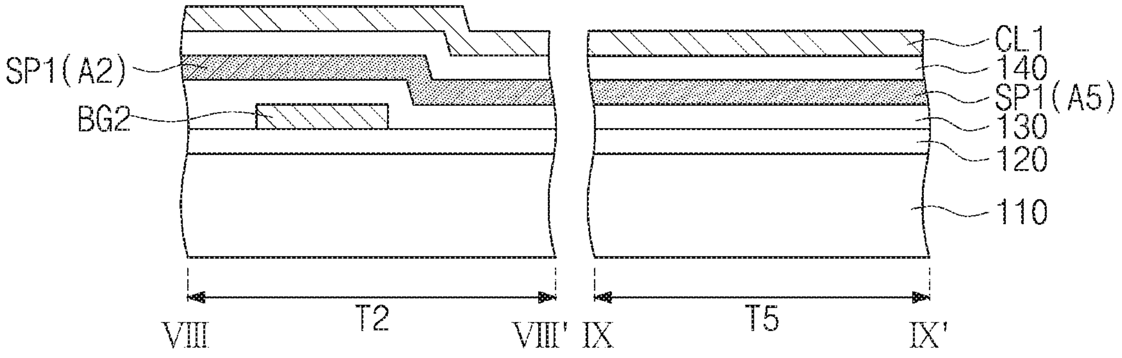

Then, as shown in FIG. 9D, the second insulating layer 140 and the first conductive layer CL1 are formed. The second insulating layer 140 may be formed by depositing, coating or printing an inorganic material and/or an organic material on the base substrate 110 or the buffer layer 120. The second insulating layer 140 may cover the initial semiconductor pattern SP1. Then, a conductive material is deposited on the second insulating layer 140 to form the first conductive layer CL1.

Figure 9E:
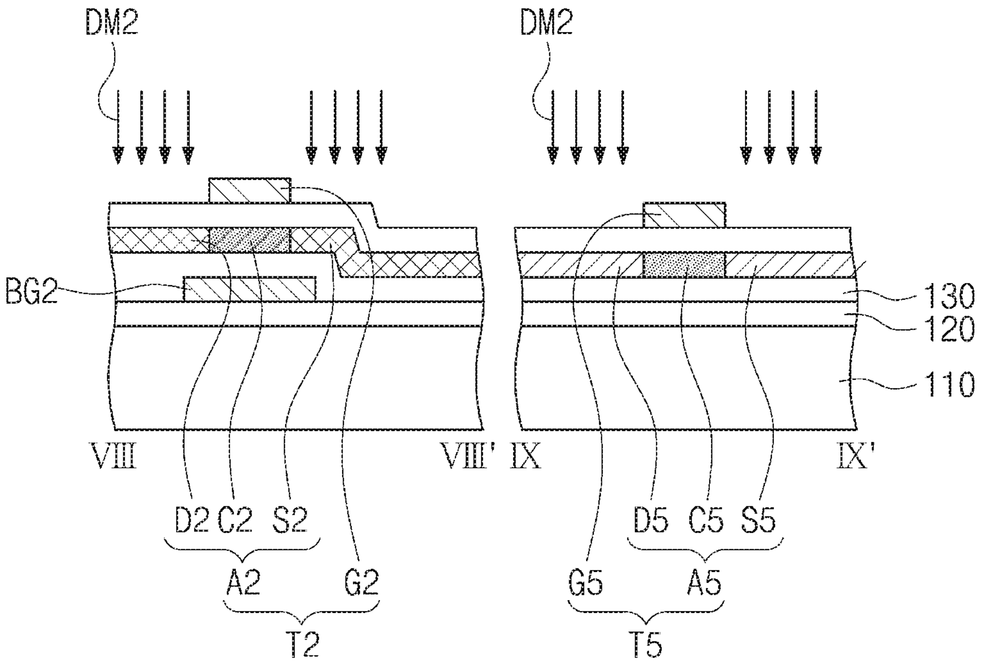

As shown in FIG. 9E, the second active pattern A2 and the fifth active pattern A5 are formed after forming the second gate electrode G2 and the fifth gate electrode G5. The second gate electrode G2 and the fifth gate electrode G5 may be formed by patterning the first conductive layer CL1. The second gate electrode G2 and the fifth gate electrode G5 may be substantially simultaneously patterned using the same mask. Meanwhile, this is merely exemplary, and the second gate electrode G2 and the fifth gate electrode G5 may be separately patterned using different masks from each other.

Then, a second impurity DM2 is injected into the initialization semiconductor pattern SP1 to form the second active pattern A2 and the fifth active pattern A5. The second impurity DM2 may be injected into the initialization semiconductor pattern SP1 using a diffusion process or an ion injection process, however it should not be particularly limited.

The second impurity DM2 may include various materials. For example, the second impurity DM2 may include a trivalent element. In this case, the second active pattern A2 and the fifth active pattern A5 may be formed a p-type semiconductor.

The second impurity DM2 is injected into an area of the initialization semiconductor pattern SP1, which is not overlapped with the second gate electrode G2 and the fifth gate electrode G5, and thus the initialization semiconductor pattern SP1 is formed in the second active pattern A2 including the second source electrode S2, the second channel C2, and the second drain electrode D2 and the fifth active pattern A5 including the fifth source electrode S5, the fifth channel C5, and the fifth drain D5.

Accordingly, the second impurity DM2 having a relatively higher concentration than that in the second channel C2 of the second active pattern A2 and the fifth channel C5 of the fifth active pattern A5 exists in the second source electrode S2 and the second drain electrode D2 of the second active pattern A2 and the fifth source electrode S5 and the fifth drain electrode D5 of the fifth active pattern A5. That is, when the initialization semiconductor pattern SP1 is doped with ion impurity using the second gate electrode G2 and the fifth gate electrode G5 as a self-aligned mask, the initialization semiconductor pattern SP1 includes the second active pattern A2 and the fifth active pattern A5, which are doped with the ion impurity.

Figure 9F:
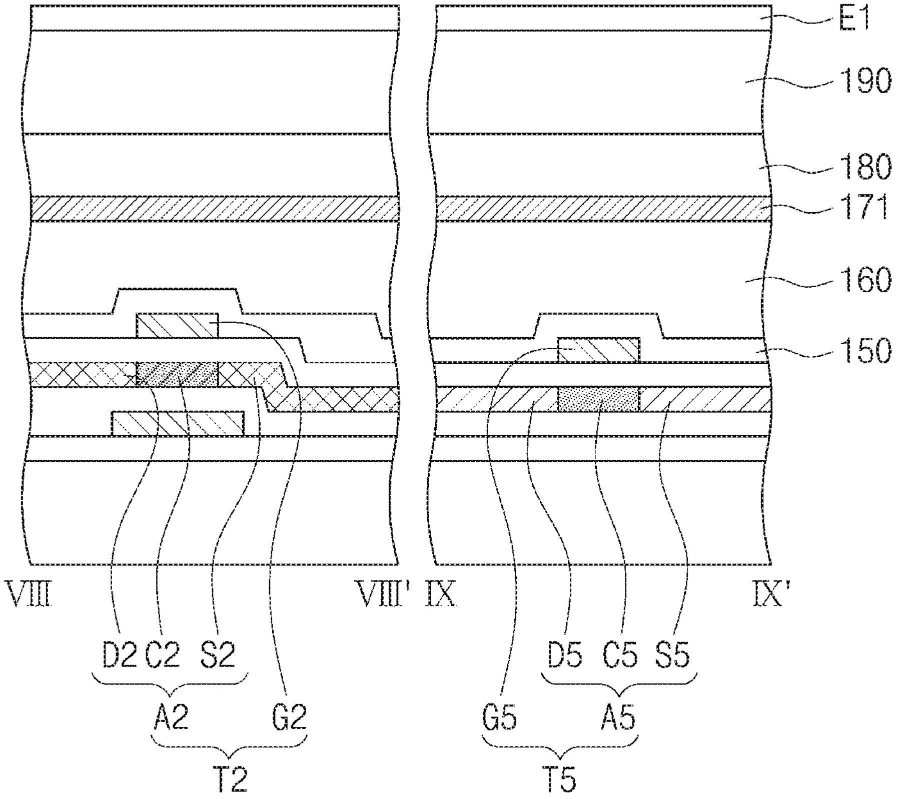

Then, as shown in FIG. 9F, the third insulating layer 150, the fourth insulating layer 160, the third conductive layer 171, the protective layer 180, the pixel definition layer 190, and the pixel electrode E1 are sequentially stacked. In the present exemplary embodiment, the third conductive layer 171 is the data line.

In the case where the third driving voltage VGH (e.g., about 7 volts) is applied to the lower gate electrode BG2 of the second transistor T2, the threshold voltage of the second transistor T2 is negatively shifted. In a case where the threshold voltage of the second transistor T2 is negatively shifted more than a desired voltage, the concentration of the first impurity DM1 doped in the area corresponding to the second active pattern A2 of the initialization semiconductor pattern SP1 may be changed.

For example, when the concentration of the boron (B) ion doped in the area corresponding to the second active pattern A2 of the initialization semiconductor pattern SP1 increases by about $1\times10^{11}$ atoms/cm$^2$, the threshold voltage of the second transistor T2 is positive shifted by about 0.1 volts.

That is, as the voltage level of the third driving voltage VGH applied to the lower gate electrode BG2 of the second transistor T2 increases, the threshold voltage of the second transistor T2 is negatively shifted, and as the concentration of the boron (B) ion doped in the area corresponding to the second active pattern A2 of the initialization semiconductor pattern SP1 increases, the threshold voltage of the second transistor T2 is positively shifted. Accordingly, a range of the threshold voltage of the second transistor T2 may be adjusted by controlling the voltage level of the third driving voltage VGH applied to the lower gate electrode BG2 of the second transistor T2 and the concentration of the boron (B) ion doped in the area corresponding to the second active pattern A2 of the initialization semiconductor pattern SP1.

According to another embodiment, the first impurity DM1 doped in the area corresponding to the second active pattern A2 of the initialization semiconductor pattern SP1 may be phosphorus (P) ion. As the concentration of the phosphorus (P) ion doped in the area corresponding to the second active pattern A2 of the initialization semiconductor pattern SP1 increases, the threshold voltage of the second transistor T2 is negatively shifted. That is, in a case where an amount of the negative shift of the threshold voltage of the second transistor is insufficient due to the third driving voltage VGH applied to the lower gate electrode BG2 of the second transistor T2, the concentration of the phosphorus (P) ion doped in the area corresponding to the second active pattern A2 of the initialization semiconductor pattern SP1 may increase.

Figure 10:
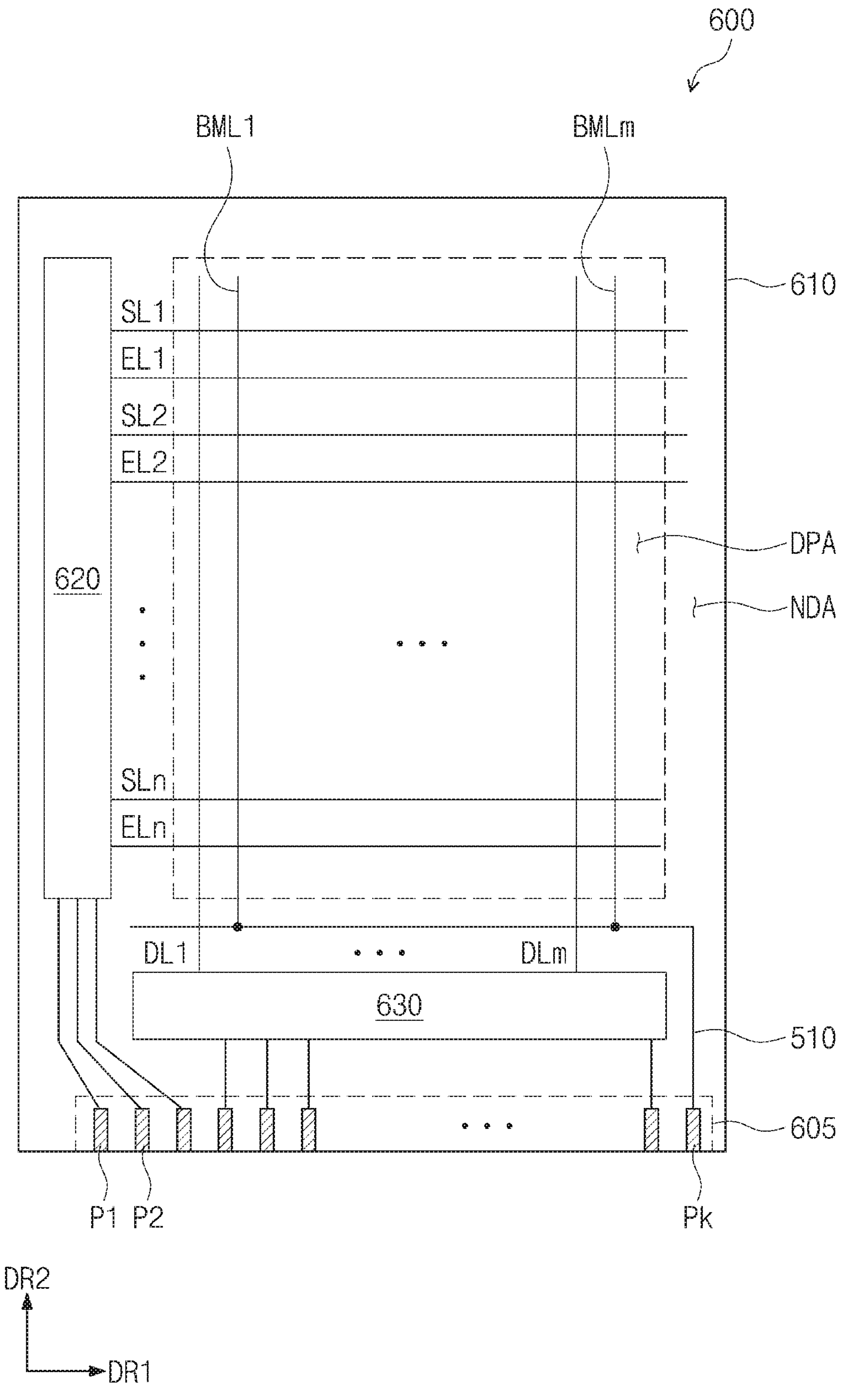
FIG. 10 is a plan view showing an organic light emitting display device according to another exemplary embodiment of the present disclosure.

FIG. 10 is a plan view showing an organic light emitting display device according to another exemplary embodiment of the present disclosure.

Referring to FIG. 10, an organic light emitting display device 600 includes a display substrate 610 including a display area DPA and a non-display area NDA. A plurality of pixels (not shown) is arranged in the display area DPA. A scan driving circuit 630 and a data driving circuit 400 are arranged in the non-display area NDA. A pad part 605 including a plurality of pads P1 to Pk aligned along an edge of the non-display area NDA is arranged in the noon display area NDA. The pads P1 to Pk are connected to an external host device (not shown) and receive signals from the host device. One pad Pk among the pads P1 to Pk may be a pad used to receive the third driving voltage VGH.

The scan driving circuit 300 generates a plurality of scan signals and sequentially outputs the scan signals to a plurality of scan lines SL1 to SLn. In addition, the scan driving circuit 300 generates a plurality of light emitting control signals and outputs the light emitting control signals to a plurality of light emitting lines EL1 to ELn.

The data driving circuit 400 outputs data signals to a plurality of data lines DL1 to DLm described later.

The display substrate 610 includes the scan lines SL1 to SLn, the light emitting lines EL1 to ELn, the data lines DL1 to DLn, third driving voltage lines BML1 to BMLm, and pixels (not shown). The scan lines SL1 to SLn extend in a first direction DR1. Each of the light emitting lines EL1 to ELn may be arranged parallel to a corresponding scan line among the scan lines SL1 to SLn. The data lines DL1 to DLm extend in a second direction DR2. The data lines DL1 to DLm are insulated from the scan lines SL1 to SLn and the light emitting lines EL1 to ELn while crossing the scan lines SL1 to SLn and the light emitting lines EL1 to ELn.

Each of the third driving voltage lines BML1 to BMLj may be arranged parallel to a corresponding data line among the data lines DL1 to DLm. In the present exemplary embodiment, the number of the third driving voltage lines BML1 to BMLm is equal to the number of the pixels arranged in the first direction DR1, i.e., the number of the data lines DL1 to DLm. The third driving voltage lines BML1 to BMLm are insulated from the scan lines SL1 to SLn and the light emitting lines EL1 to ELn while crossing the scan lines SL1 to SLn and the light emitting lines EL1 to ELn.

Figure 11:
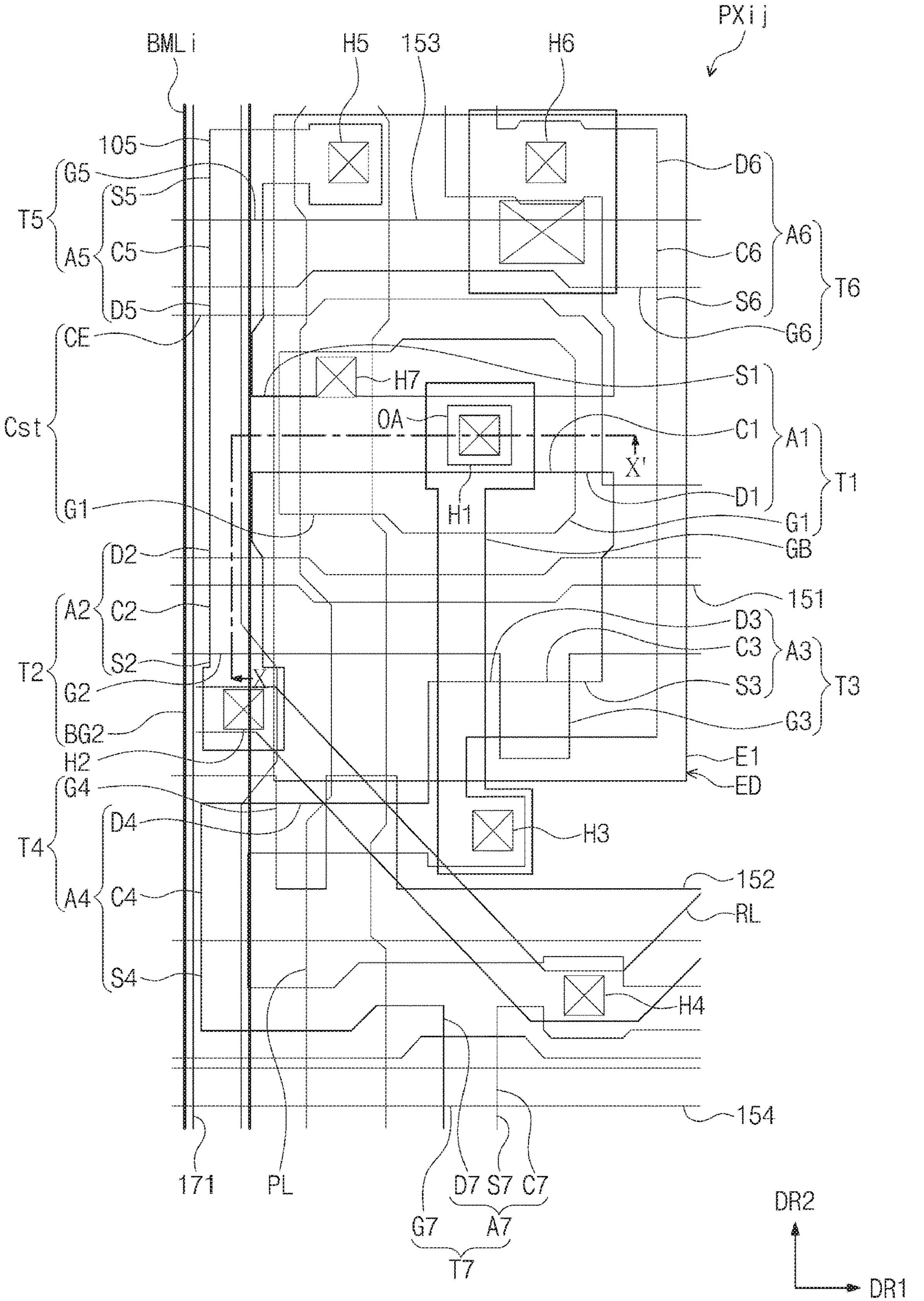
FIG. 11 is a plan view showing one pixel of an organic light emitting display device according to an exemplary embodiment of the present disclosure.
Figure 12:
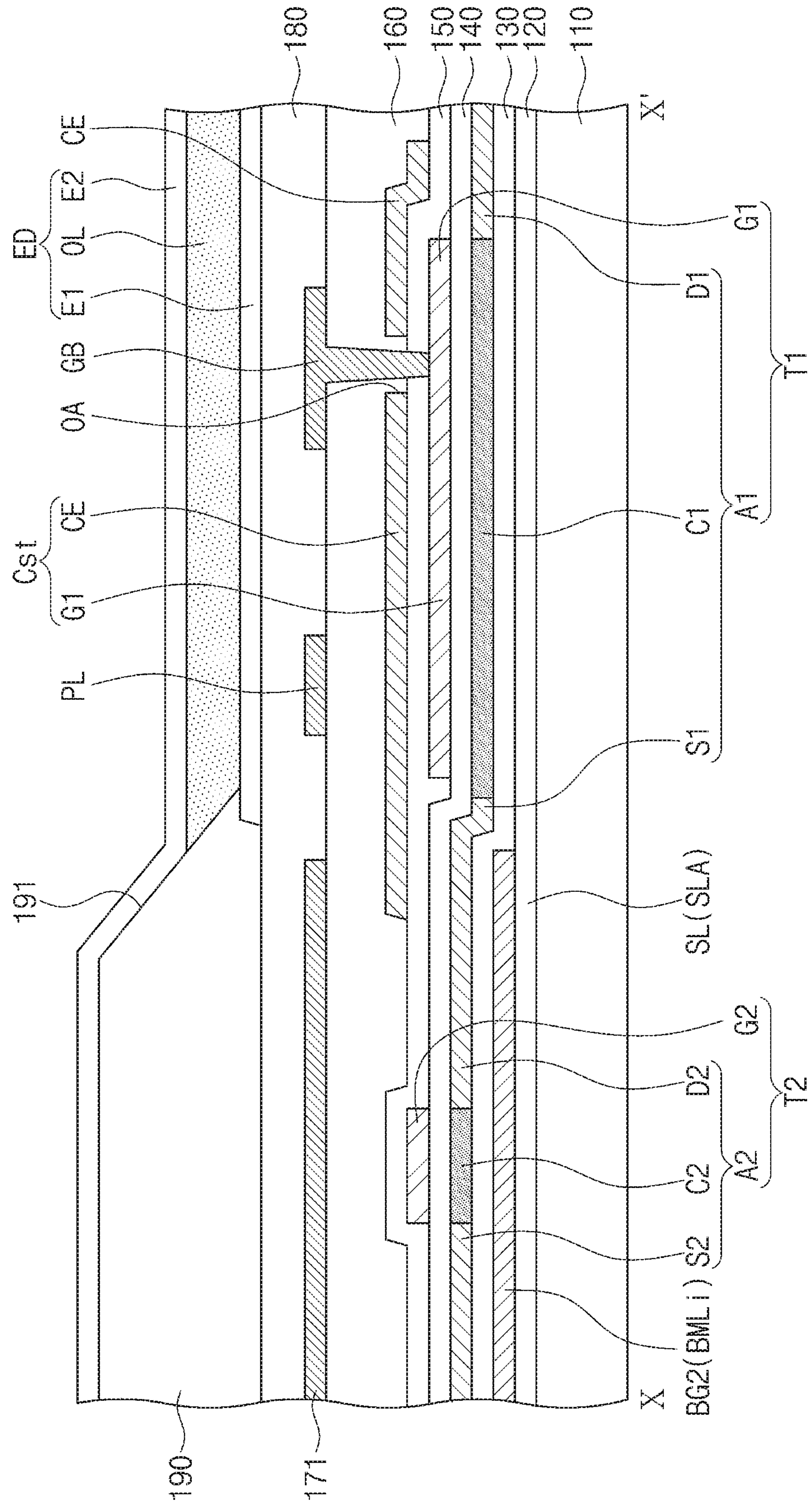
FIG. 12 is a cross-sectional view taken along a line X-X' of FIG. 11 to show the organic light emitting display device.

FIG. 11 is a plan view showing one pixel of an organic light emitting display device according to an exemplary embodiment of the present disclosure. FIG. 12 is a cross-sectional view taken along a line X-X' of FIG. 11 to show the organic light emitting display device.

In FIGS. 11 and 12, the same elements of the pixel PXij are assigned with the same reference numerals as the pixel PXij shown in FIGS. 4 and 5.

Referring to FIG. 11, a third driving voltage line BML1 overlaps with a data line 171. When a third driving voltage VGH is applied to the third driving voltage line BML1, a threshold voltage of a second transistor T2 is controlled in accordance with the voltage level of the voltage applied to the third driving voltage line BML1.

In the present exemplary embodiment, the third driving voltage line BML1 is disposed under the data line 171. A width in the first direction DR1 of the third driving voltage line BML1 is wider than a width in the first direction DR1 of the data line 171.

The cross-sectional structure of the display device according to an exemplary embodiment will be described in detail with reference to FIG. 12.

A buffer layer 120 is disposed on a substrate 110. A lower gate electrode BG2 is disposed on the buffer layer 120, and a first insulating layer 130 is disposed on the lower gate electrode BG2. The lower gate electrode BG2 includes a metal material, however it should not be limited to the metal material. That is, the lower gate electrode BG2 may include other materials that may be used to supply the power, e.g., a conductive polymer. A second channel of a second active panel A2 overlaps with the lower gate electrode BG2. When the third driving voltage VGH is applied to the lower gate electrode BG2, electric charges, such as electrons or holes, are accumulated in the second channel C2 of the second active pattern A2 in accordance with a polarity of the power source applied to the third driving voltage line BML1. Accordingly, the threshold voltage of the second transistor T2 is controlled.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. An organic light emitting display device comprising:

a substrate;

a light emitting diode disposed on the substrate and comprising an anode and a cathode;

a first transistor comprising a first gate electrode and a first channel overlapped with the first gate electrode when viewed in a plan view;

a second transistor comprising a second gate electrode, a second channel overlapped with the second gate electrode when viewed in a plan view, and a lower gate electrode; and a plurality of driving voltage lines configured to transmit a first driving voltage, wherein the lower gate electrode of the second transistor is overlapped with the second gate electrode when viewed in a plan view with the second channel interposed between the second gate electrode and the lower gate electrode, and the lower gate electrode is electrically connected to a corresponding driving voltage line among the driving voltage lines.

2. The organic light emitting display device of claim 1, further comprising a plurality of scan lines extending in a first direction and arranged spaced apart from each other in a second direction crossing the first direction, wherein the second gate electrode of the second transistor is connected to a corresponding scan line among the scan lines.

3. The organic light emitting display device of claim 2, wherein the driving voltage lines respectively correspond to the scan lines and each of the driving voltage lines is overlapped with a corresponding scan line among the scan lines.

4. The organic light emitting display device of claim 3, wherein the driving voltage lines are electrically connected to each other.

5. The organic light emitting display device of claim 3, wherein a width in the second direction of each of the driving voltage lines is wider than a width in the second direction of the corresponding scan line among the scan lines.

6. The organic light emitting display device of claim 3, further comprising a voltage line, wherein the substrate comprises:

a display area in which the light emitting diode is disposed; and a non-display area disposed adjacent to the display area, and the driving voltage lines extend from the voltage line in the first direction, wherein the voltage line extends in the second direction in the non-display area.

7. The organic light emitting display device of claim 1, wherein the lower gate electrode is disposed between the substrate and a second active pattern comprising the second channel of the second transistor.

8. The organic light emitting display device of claim 1, wherein the driving voltage lines is not overlapped with a first active pattern comprising the first channel of the first transistor when viewed in a plan view.

9. The organic light emitting display device of claim 1, further comprising a plurality of data lines extending in a second direction and arranged spaced apart from each other in a first direction different from the second direction.

10. The organic light emitting display device of claim 9, wherein the driving voltage lines respectively correspond to the data lines and each of the driving voltage lines is overlapped with the corresponding data line among the data lines.

11. The organic light emitting display device of claim 10, wherein the driving voltage lines are connected to each other.

12. The organic light emitting display device of claim 10, wherein each of the driving voltage lines has a width wider than a width in the first direction of the corresponding data line among the data lines.

13. The organic light emitting display device of claim 1, wherein a doping concentration of the first channel of the first transistor is different from a doping concentration of the second channel of the second transistor.

14. The organic light emitting display device of claim 1, further comprising a third transistor that is connected between the first transistor and the anode of the light emitting diode.

15. An organic light emitting display device comprising:

a substrate;

a plurality of pixels disposed on the substrate;

a plurality of scan lines extending in a first direction and respectively connected to the pixels;

a plurality of data lines extending in a second direction crossing the first direction and respectively connected to the pixels; and a plurality of driving voltage lines configured to transmit a first driving voltage to the pixels, each of the pixels comprising:

a light emitting diode comprising an anode and a cathode;

a first transistor comprising a first gate electrode and a first channel overlapped with the first gate electrode when viewed in a plan view; and a second transistor comprising a second gate electrode connected to a corresponding scan line among the scan lines, a second channel overlapped with the second gate electrode when viewed in a plan view, and a lower gate electrode overlapped with the second gate electrode when viewed in a plan view with the second channel interposed between the second gate electrode and the lower gate electrode, wherein the lower gate electrode is electrically connected to a corresponding driving voltage line among the driving voltage lines.

16. The organic light emitting display device of claim 15, wherein the lower gate electrode of the second transistor is overlapped with the second channel when viewed in a plan view.

17. The organic light emitting display device of claim 15, wherein the driving voltage lines extend in the first direction and each of the driving voltage lines is overlapped with a corresponding scan line among the scan lines.

18. The organic light emitting display device of claim 15, further comprising a voltage line, wherein the substrate comprises:

a display area in which the light emitting diode is disposed; and a non-display area disposed adjacent to the display area, and the driving voltage lines extend from the voltage line in the first direction, wherein the voltage line extends in the second direction in the non-display area.

19. The organic light emitting display device of claim 15, wherein the driving voltage lines extend in the second direction, and each of the driving voltage line is overlapped with the corresponding data line among the data lines when viewed in a plan view.

20. The organic light emitting display device of claim 15, wherein the driving voltage lines are not overlapped with a first active pattern comprising the first channel of the first transistor when viewed in a plan view.

* * * * *